us011093396B2

(12) United States Patent
Robinson et al.

(10) Patent No.: US 11,093,396 B2
(45) Date of Patent: Aug. 17, 2021

(54) ENABLING ATOMIC MEMORY ACCESSES ACROSS COHERENCE GRANULE BOUNDARIES IN PROCESSOR-BASED DEVICES

(71) Applicant: Microsoft Technology Licensing, LLC, Redmond, WA (US)

(72) Inventors: Eric Francis Robinson, Raleigh, NC (US); Derek Bachand, Raleigh, NC (US); Jason Panavich, Raleigh, NC (US); Kevin Neal Magill, Durham, NC (US); Michael B. Mitchell, Fuquay-Varina, NC (US); Michael P. Wilson, Fuquay-Varina, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 16/678,765

(22) Filed: Nov. 8, 2019

(65) Prior Publication Data

US 2021/0141726 A1 May 13, 2021

(51) Int. Cl.
*G06F 12/0831* (2016.01)
*G06F 12/0837* (2016.01)

(52) U.S. Cl.
CPC ...... *G06F 12/0831* (2013.01); *G06F 12/0837* (2013.01); *G06F 2212/602* (2013.01)

(58) Field of Classification Search
CPC ............ G06F 12/0815; G06F 12/0831; G06F 12/0837; G06G 2212/602
See application file for complete search history.

(56) References Cited

U.S. PATENT DOCUMENTS

| 7,680,987 | B1* | 3/2010 | Clark ................. G06F 12/0815 711/147 |
| 7,730,265 | B1 | 6/2010 | Cypher et al. |
| 2019/0108144 | A1 | 4/2019 | Fernando |
| 2020/0201766 | A1* | 6/2020 | Williams ............ G06F 12/0808 |

OTHER PUBLICATIONS

"International Search Report and Written Opinion Issued in PCT Application No. PCT/US20/057435", dated Feb. 17, 2021, 10 Pages.

* cited by examiner

*Primary Examiner* — Aracelis Ruiz
(74) *Attorney, Agent, or Firm* — Withrow & Terranova, PLLC

(57) ABSTRACT

Enabling atomic memory accesses across coherence granule boundaries in processor-based devices is disclosed. In this regard, a processor-based device includes multiple processing elements (PEs), and further includes a special-purpose central ordering point (SPCOP) configured to distribute coherence granule ("cogran") pair atomic access (CPAA) tokens. To perform an atomic memory access on a pair of coherence granules, a PE must hold a CPAA token for an address block containing one of the pair of coherence granules before the PE can obtain each of the pair of coherence granules in an exclusive state. Because a CPAA token must be acquired before obtaining exclusive access to at least one of the pair of coherence granules, and because the SPCOP is configured to allow only one CPAA token to be active for a given address block, deadlocks and livelocks between PEs seeking to access the same coherence granules can be avoided.

23 Claims, 15 Drawing Sheets

ENABLING ATOMIC MEMORY ACCESSES ACROSS COHERENCE GRANULE BOUNDARIES IN PROCESSOR-BASED DEVICES

FIELD OF THE DISCLOSURE

The technology of the disclosure relates to memory access operations in processor-based devices, and, more particularly, to atomic memory accesses that may occur across coherence granule boundaries.

BACKGROUND

An "atomic memory access" performed by a processor-based device refers to a memory access operation (e.g., a memory read operation or a memory write operation, as non-limiting examples) in which all bytes of data being accessed are simultaneously observable. Atomic memory accesses ensure that, even if multiple agents attempt conflicting operations on a same memory location, the resulting value stored at that memory location will be either the entire previous value or the entire final value, and never a combination of the two. Depending on what memory model is supported by a processor-based device's instruction set architecture (ISA), the processor-based device may expect or require that some or all types of memory access operations be performed atomically. For instance, a system memory of a processor-based device may be organized into subdivisions referred to as "coherence granules" representing the aligned size, in bytes, at which the processor-based device manages cache coherency, and the processor-based device may require that all memory access operations within a single coherence granule be executed atomically.

However, issues may arise when an atomic memory access crosses a boundary between two coherence granules. Consider a scenario in which bytes within a system memory at memory addresses 0 to 63 are located within a first coherence granule, while bytes at memory addresses 64 to 127 are located within a second coherence granule. A memory store operation writing four (4) bytes of data starting at memory address 62 would thus need to write the first two (2) bytes to the first coherence granule and the second two (2) bytes to the second coherence granule. To perform the memory store operation atomically, both coherence granules would need to be acquired in an exclusive state at the same time. Once a processing element (PE) (e.g., a processor or processor core) obtains exclusive access to both coherence granules, the memory store operation can be completed, and another PE may then access one or both of the coherence granules.

Assume, though, that two PEs each attempts to execute a memory store operation atomically on the same two coherence granules at approximately the same time. The first PE may obtain the first coherence granule in an exclusive state, and then deny access to the first coherence granule by other PEs until the first PE can obtain the second coherence granule in an exclusive state. At the same time, the second PE may obtain the second coherence granule in an exclusive state, and deny access to the first coherence granule by other PEs until the second PE can obtain the first coherence granule in an exclusive state. This gives rise to a deadlock, with each PE refusing to surrender its coherence granule until the other PE surrenders its coherence granule. One technique for avoiding such a deadlock is to disallow the PEs from holding its respective coherence granule in the manner described above, and require each PE to wait until it acquires exclusive access to both coherence granules before completing its memory store operation. However, this technique may lead to a livelock, where each PE repeatedly gives up its coherence granule to the other PE upon request.

One conventional technique for atomic memory accesses across coherence granule boundaries involves the processor-based device detecting that the memory access operation crosses a coherence granule boundary, and, to handle the situation, the processor "locks the bus," or restricts access to an interconnect bus to the PE seeking to perform the memory access operation. Once that PE obtains exclusive access to both coherence granules and completes the memory access operation atomically, the interconnect bus is then unlocked. Locking the bus, though, may incur significant performance penalties due to the interconnect bus only being accessible by one PE while locked. Another conventional technique involves the underlying ISA of the processor-based device not guaranteeing that a memory access operation will be performed atomically if it crosses a coherence granule boundary. In this case, software must detect that the memory access operation crosses a coherence granule boundary, and attempt to handle the memory access operation by quiescing all other executing threads in the PE to perform a form of software-based bus lock. However, such a software-based approach may be more complex and less reliable than a hardware-based approach.

Accordingly, a more efficient mechanism for enabling atomic memory accesses across coherence granule boundaries is desirable.

SUMMARY

Exemplary embodiments disclosed herein include enabling atomic memory accesses across coherence granule boundaries in processor-based devices. In this regard, in one exemplary embodiment, a processor-based device, comprising a plurality of processing elements (PEs), further includes a special-purpose central ordering point (SPCOP) that is configured to distribute a coherence granule ("cogran") pair atomic access (CPAA) token. To perform an atomic memory access on a pair of coherence granules, a PE must hold a CPAA token for a memory-aligned address block containing at least one of the pair of coherence granules before the PE can demand to obtain the pair of coherence granules in an exclusive state. Each of the coherence granules may be considered "even" or "odd" based on, e.g., the value of the lowest-order bit of the memory address used to select the coherence granule. Thus, in embodiments described herein in which each address block contains exactly one (1) coherence granule, the SPCOP may associate CPAA tokens with address blocks that each contain only an "even" coherence granule (or only an "odd" coherence granule). Because CPAA tokens are always associated with address blocks containing "even" coherence granules (or "odd" coherence granules, depending on implementation), and the SPCOP only allows one CPAA token to be active at a time for a given address block, deadlocks and livelocks between multiple PEs seeking to access the same coherence granules for atomic memory accesses can be avoided. Once a PE obtains the CPAA token for an address block containing a first coherence granule of a pair of coherence granules, the PE obtains the first coherence granule of the pair of coherence granules in an exclusive state, then obtains the second coherence granule of the pair of coherence granules in an exclusive state. The PE then completes the atomic memory access request, and returns the CPAA token to the SPCOP.

Some embodiments may further provide that the SPCOP comprises a CPAA access queue for tracking requests to access coherence granules under protection by a CPAA token, while the SPCOP in some embodiments may comprise a CPAA reservation queue for tracking multiple requests for CPAA tokens for a given coherence granule.

In another exemplary embodiment, a processor-based device is provided. The processor-based device comprises a system memory comprising a plurality of address blocks and a plurality of coherence granules, and a SPCOP comprising an SPCOP logic circuit. The processor-based device further comprises a plurality of PEs each comprising a memory access logic circuit. The memory access logic circuit of a first PE of the plurality of PEs is configured to detect an atomic memory access request that spans a boundary between a first coherence granule and a second coherence granule of the system memory. The memory access logic circuit of the first PE is further configured to send a request for a CPAA token for the address block containing the first coherence granule to the SPCOP. The memory access logic circuit of the first PE is also configured to receive, from the SPCOP, the CPAA token for the address block containing the first coherence granule, the CPAA token indicating that the first PE of the plurality of PEs is allowed to protect the address block containing the first coherence granule. The memory access logic circuit of the first PE is additionally configured to obtain the first coherence granule and the second coherence granule in an exclusive state. The memory access logic circuit of the first PE is further configured to complete the atomic memory access request. The memory access logic circuit of the first PE is also configured to send a request to return the CPAA token for the address block containing the first coherence granule to the SPCOP.

In another exemplary embodiment, a method for enabling atomic memory accesses that cross coherence granule boundaries is provided. The method comprises detecting, by a first PE of a plurality of PEs of a processor-based device, an atomic memory access request that spans a boundary between a first coherence granule and a second coherence granule of a system memory of the processor-based device. The method further comprises sending, by the first PE, a first request for a CPAA token for the address block containing the first coherence granule to a SPCOP. The method also comprises receiving, by the first PE from the SPCOP, the CPAA token for the address block containing the first coherence granule, the CPAA token indicating that the first PE of the plurality of PEs is allowed to protect the address block containing the first coherence granule. The method additionally comprises obtaining, by the first PE, the first coherence granule and the second coherence granule in an exclusive state. The method further comprises completing, by the first PE, the atomic memory access request. The method also comprises sending, by the first PE, a request to return the CPAA token for the address block containing the first coherence granule to the SPCOP.

In another exemplary embodiment, a non-transitory computer-readable medium is provided. The computer-readable medium stores thereon computer-executable instructions which, when executed by a processor, cause the processor to detect an atomic memory access request that spans a boundary between a first coherence granule and a second coherence granule of a system memory. The computer-executable instructions further cause the processor to send a request for a CPAA token for the address block containing the first coherence granule to a SPCOP of the processor. The computer-executable instructions also cause the processor to receive, from the SPCOP, the CPAA token for the address block containing the first coherence granule, the CPAA token indicating that the processor is allowed to protect the address block containing the first coherence granule. The computer-executable instructions additionally cause the processor to obtain the first coherence granule and the second coherence granule in an exclusive state. The computer-executable instructions further cause the processor to complete the atomic memory access request. The computer-executable instructions also cause the processor to send a request to return the CPAA token for the address block containing the first coherence granule to the SPCOP.

Those skilled in the art will appreciate the scope of the present disclosure and realize additional embodiments thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several embodiments of the disclosure, and together with the description serve to explain the principles of the disclosure.

DETAILED DESCRIPTION

Exemplary embodiments disclosed herein include enabling atomic memory accesses across coherence granule boundaries in processor-based devices. In this regard, in one exemplary embodiment, a processor-based device, comprising a plurality of processing elements (PEs), further includes a special-purpose central ordering point (SPCOP) that is configured to distribute a coherence granule ("cogran") pair atomic access (CPAA) token. To perform an atomic memory access on a pair of coherence granules, a PE must hold a CPAA token for a memory-aligned address block containing at least one of the pair of coherence granules before the PE can demand to obtain the pair of coherence granules in an exclusive state. Each of the coherence granules may be considered "even" or "odd" based on, e.g., the value of the lowest-order bit of the memory address used to select the coherence granule. Thus, in embodiments described herein in which each address block contains exactly one (1) coherence granule, the SPCOP may associate CPAA tokens with address blocks that each contain only an "even" coherence granule (or only an "odd" coherence granule). Because CPAA tokens are always associated with address blocks containing "even" coherence granules (or "odd" coherence granules, depending on implementation), and the SPCOP only allows one CPAA token to be active at a time for a given address block, deadlocks and livelocks between multiple PEs seeking to access the same coherence granules for atomic memory accesses can be avoided. Once a PE obtains the CPAA token for an address block containing a first coherence granule of a pair of coherence granules, the PE obtains the first coherence granule of the pair of coherence granules in an exclusive state, then obtains the second coherence granule of the pair of coherence granules in an exclusive state. The PE then completes the atomic memory access request, and returns the CPAA token to the SPCOP. Some embodiments may further provide that the SPCOP comprises a CPAA access queue for tracking requests to access coherence granules under protection by a CPAA token, while the SPCOP in some embodiments may comprise a CPAA reservation queue for tracking multiple requests for CPAA tokens for a given coherence granule.

Figure 1:
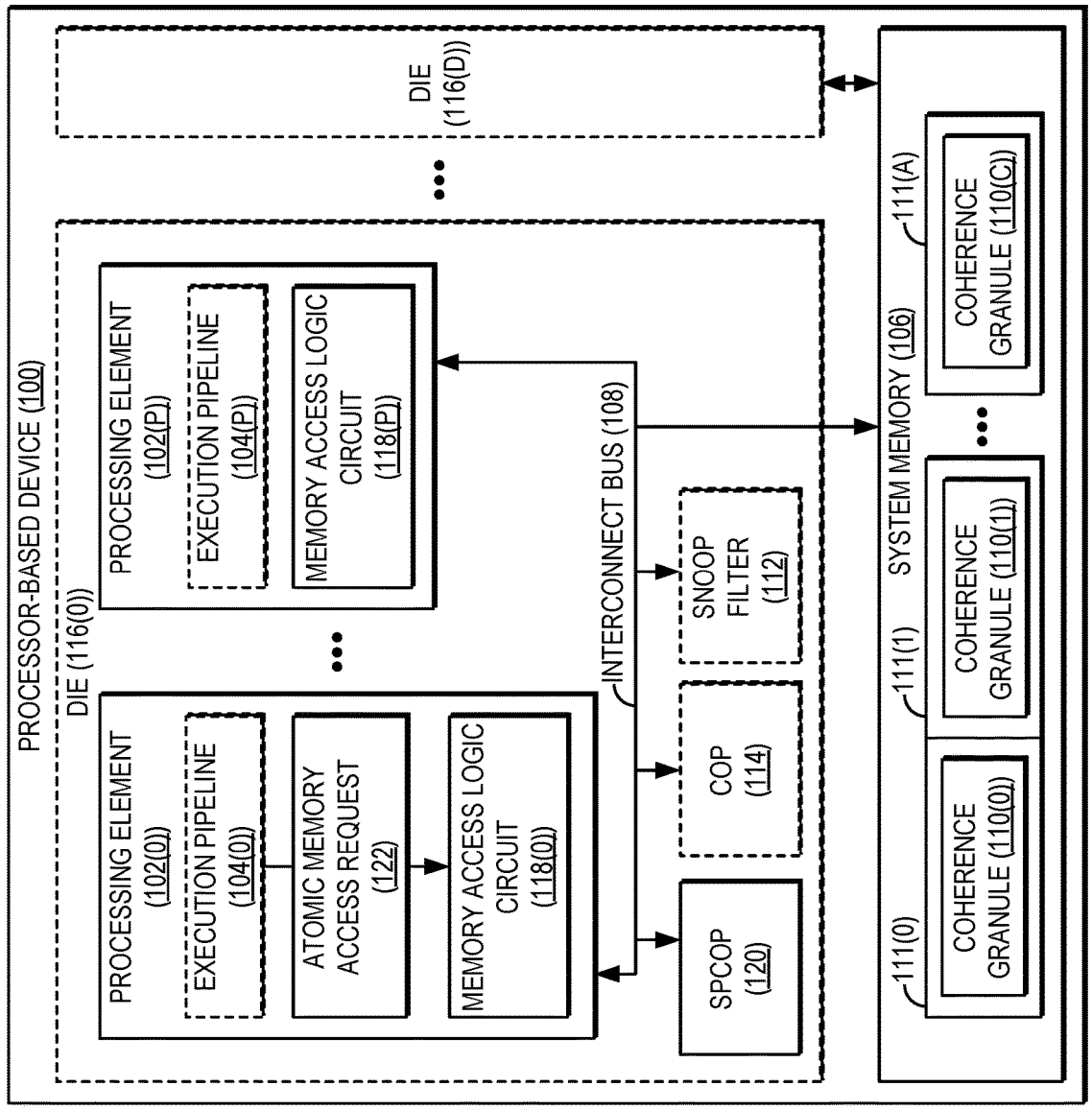
FIG. 1 is a block diagram illustrating an exemplary processor-based device that includes a special-purpose central ordering point (SPCOP) configured to enable atomic memory access across coherence granule boundaries, according to some embodiments.

In this regard, FIG. 1 illustrates an exemplary processor-based device 100 that provides a plurality of processing elements (PEs) 102(0)-102(P) for processing executable instructions. Each of the PEs 102(0)-102(P) may comprise a central processing unit (CPU) having one or more processor cores, or may comprise an individual processor core comprising a logical execution unit and associated caches and functional units. In the example of FIG. 1, each of the PEs 102(0)-102(P) includes a corresponding execution pipeline 104(0)-104(P) that is configured to perform out-of-order execution of an instruction stream comprising computer-executable instructions. As non-limiting examples, the execution pipelines 104(0)-104(P) each may include a fetch stage for retrieving instructions for execution, a decode stage for translating fetched instructions into control signals for instruction execution, a rename stage for allocating physical register file (PRF) registers, a dispatch stage for issuing instructions for execution, an execute stage for sending instructions and operands to execution units, and/or a commit stage for irrevocably updating the architectural state of the corresponding PE 102(0)-102(P) based on the results of instruction execution.

The PEs 102(0)-102(P) of the processor-based device 100 of FIG. 1 are interconnected to each other and to a system memory 106 by an interconnect bus 108. As seen in FIG. 1, the system memory 106 is subdivided into multiple coherence granules 110(0)-110(C), each representing the smallest unit of memory (e.g., 64 bytes, as a non-limiting example) for which memory coherence is maintained by the processor-based device 100. The system memory 106 is also divided into address blocks 111(0)-111(A). In the example of FIG. 1, the address blocks 111(0)-111(A) each contain a corresponding one of the coherence granules 110(0)-110(C). The processor-based device 100 according to some embodiments may further provide a snoop filter 112 to monitor traffic on the interconnect bus 108 to track coherence states of cache lines (not shown) of the PEs 102(0)-102(P). The processor-based device 100 in some embodiments may also provide a central ordering point 114 for ordering, e.g., cache misses and invalidation requests.

The processor-based device 100 of FIG. 1 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 100 may include elements in addition to those illustrated in FIG. 1. For example, each of the PEs 102(0)-102(P) may further include one or more functional units, instruction caches, unified caches, memory controllers, interconnect buses, and/or additional memory devices, caches, and/or controller circuits, which are omitted from FIG. 1 for the sake of clarity. Additionally, in some embodiments, the PEs 102(0)-102(P) may all be co-located on a single die 116(0) of a plurality of dies 116(0)-116(D) of the processor-based device 100. In such embodiments, each die 116(1)-116(D) includes a plurality of PEs corresponding to the PEs 102(0)-102(P) of the die 116(0).

As noted above, the PEs 102(0)-102(P) may face issues when attempting to perform an atomic memory access that crosses a boundary between two of the coherence granules 110(0)-110(C). For example, assume that the PE 102(0) and the PE 102(P) each attempt to perform an atomic memory store operation that spans the coherence granule 110(0) and the coherence granule 110(1). The PE 102(0) may obtain the coherence granule 110(0) in an exclusive state, and then deny access to the coherence granule 110(0) by the PE 102(P) until the PE 102(0) can obtain the coherence granule 110(1) in an exclusive state. At the same time, the PE 102(P) may obtain the coherence granule 110(1) in an exclusive state, and deny access to the coherence granule 110(1) by the PE 102(0) until the PE 102(P) can obtain the coherence granule 110(0) in an exclusive state. This results in a deadlock, with each PE 102(0), 102(P) refusing to surrender its coherence granule 110(0), 100(1). A livelock may also arise in similar circumstances if the PEs 102(0) and 102(P) continually exchange holds on the coherence granules 110(0) and 110(1).

In this regard, the processor-based device 100 of FIG. 1 is configured to enable atomic memory accesses across coherence granule boundaries. In particular, embodiments described herein are directed to memory access operations that require exclusive access to two (2) of the coherence granules 110(0)-110(C) (e.g., coherence granules 110(0) and 110(1), as non-limiting examples). It is to be understood that memory access operations may store and load data using virtual addresses, and as a result a memory access operation that crosses a coherence granule boundary may cross a physical page boundary (i.e., the memory access operation may begin within a last coherence granule of one physical page and end within a first coherence granule of another physical page). Additionally, although the virtual address may be contiguous (i.e., the memory access operation begins on one coherence granule and ends on the next sequential coherence granule), the corresponding physical addresses might not be contiguous.

Each of the PEs 102(0)-102(P) provides a corresponding memory access logic circuit 118(0)-118(P) that works in concert with a special-purpose central ordering point (SPCOP) 120 to enable atomic memory accesses across coherence granule boundaries. Each of the memory access logic circuits 118(0)-118(P) may exist as a discrete element of the corresponding PE 102(0)-102(P), or may be integrated into one or more elements of the corresponding PE 102(0)-102(P), such as the execution pipelines 104(0)-104(P). In exemplary operation, and using the PE 102(0) as an example, the memory access logic circuit 118(0) is configured to first detect an atomic memory access request 122 that spans a boundary between the coherence granule 110(0) and the coherence granule 110(1). The memory access logic circuit 118(0) of the PE 102(0) is configured to require a CPAA token for the address block 111(0) containing the first coherence granule 110(0) of the pair of coherence granules 110(0), 110(1) on which the atomic memory access is to be performed before the PE 102(0) can obtain exclusive access to the pair of coherence granules 110(0), 110(1). Thus, the memory access logic circuit 118(0) next requests a CPAA token from the SPCOP 120. The SPCOP 120 is configured to allow only one CPAA token to be active at a time for a given non-overlapping address block 111(0)-111(A), but in some embodiments may allow multiple CPAA tokens to be active for different address blocks 111(0)-111(A) at the same time.

In the example of FIG. 1, the size of the address blocks 111(0)-111(A) equals the size of the coherence granules 110(0)-110(C), such that each of the pair of coherence granules 110(0), 110(1) is located within a different address block 111(0), 111(1). Accordingly, the CPAA token is always associated with a particular one of any given pair of address blocks 111(0), 111(1). As non-limiting examples, each of the coherence granules 110(0)-110(C) may be determined to be an "even" or an "odd" coherence granule 110(0)-110(C) based on, e.g., the value of the lowest order bit in the memory address of the coherence granule 110(0)-110(C). The memory access logic circuit 118(0) of the PE 102(0) thus may be configured to always deterministically select the address block 111(0) containing the "even" coherence granule 110(0) (or the address block 111(1) containing the "odd" coherence granule 110(1), depending on implementation) as the address block for which a CPAA token is requested.

It is to be understood that in some embodiments, each of the PEs 102(0)-102(P) may provide a single SPCOP, or may provide multiple SPCOPs that are each associated with a specified range of the entire address space of the system memory 106. Upon receiving the request for the CPAA token, the SPCOP 120 in some embodiments records the memory address used to select the first coherence granule (e.g., the coherence granule 110(0) in this example) and an identifier of the PE 102(0) that requested the CPAA token, and then distributes the CPAA token to the PE 102(0).

Once the PE 102(0) has obtained a CPAA token, it can then demand to obtain the first coherence granule 110(0) in an exclusive state. Upon acquiring the first coherence granule 110(0) in an exclusive state, a "CPAA protection window" is established for the first coherence granule 110(0). The CPAA protection window allows the PE 102(0) to protect its hold of the first coherence granule 110(0) until it makes progress on obtaining the second coherence granule 110(1). After the PE 102(0) obtains the second coherence granule 110(1) in an exclusive state, the PE 102(0) completes the atomic memory access request 122, and then returns the CPAA token for the address block 111(0) containing the first coherence granule 110(0) to the SPCOP 120. Because the PE 102(0) must hold the CPAA token for the address block containing the first coherence granule 110(0) to protect the address block containing the first coherence granule 110(0) until it obtains the second coherence granule 110(1) in an exclusive state, a deadlock can be avoided. Similarly, because the PE 102(0), once it obtains the CPAA token for the address block containing the first coherence granule 110(0), is permitted to protect the address block containing the first coherence granule 110(0) until it obtains the second coherence granule 110(1) in an exclusive state, a livelock can also be avoided.

In some embodiments, when the PE 102(0) has a CPAA protection window open for the first coherence granule 110(0) and receives a snoop request (e.g., from the PE 102(P) of FIG. 1) indicating an attempt to access the first coherence granule 110(0), the memory access logic circuit 118(0) of the PE 102(0) is configured to send a response indicating that the PE 102(P) should send its request to the SPCOP 120 before it is permitted to come back on the conventional path. This prevents access to a coherence granule that is covered by a CPAA protection window for the duration of that CPAA protection window. Otherwise, there exists the possibility of a starvation issue if the second coherence granule 110(1) should need to be serviced by the same system resources that are handling the first coherence granule 110(0). For example, if requests directed to the first coherence granule 110(0) are not directed to the SPCOP 120 when they are resent, their presence in the conventional request path may prevent the PE 102(0) from making progress on obtaining the second coherence granule 110(1) in an exclusive state.

Figure 2:
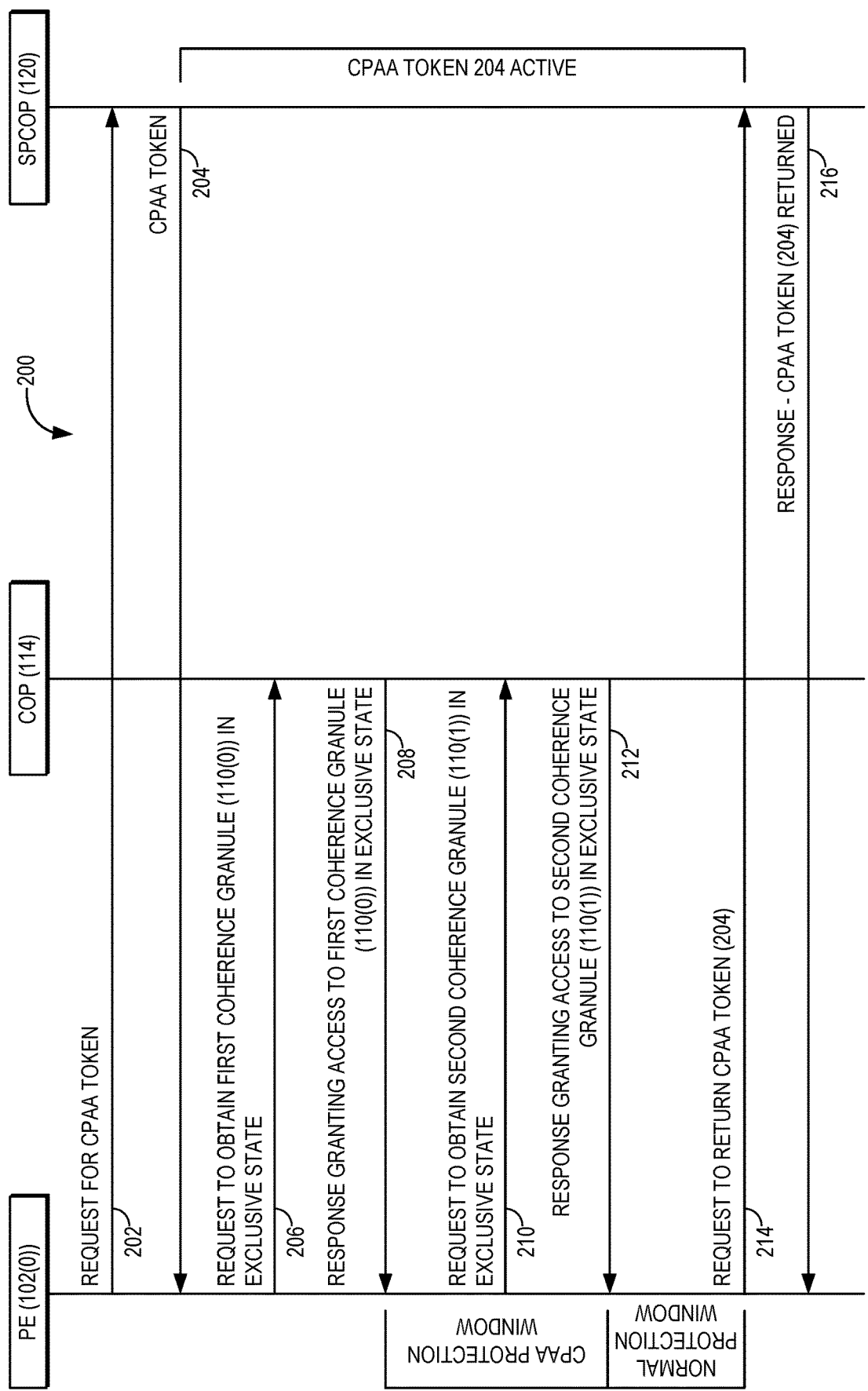
FIG. 2 is a message flow diagram illustrating exemplary communication flows between the SPCOP and a PE of the processor-based device of FIG. 1 for requesting a coherence granule ("cogran") pair atomic access (CPAA) token and obtaining exclusive access to a coherence granule pair to perform an atomic memory access operation.

To illustrate communication flows among elements of the processor-based device 100 of FIG. 1 for requesting a CPAA token and performing an atomic memory access operation according to one example, FIG. 2 is provided. Elements of FIG. 1 are referenced in describing FIG. 2 for the sake of clarity. In the example of FIG. 2, it is assumed that the size of each address block 111(0)-111(A) is the same as the size of each coherence granule 110(0)-110(C). As seen in FIG. 2, a message flow diagram 200 shows the PE 102(0), the COP 114, and the SPCOP 120 represented by vertical lines, with communications between these elements illustrated by captioned arrows. Note that, while in the example of FIG. 2, the COP 114 is shown servicing both the first coherence granule 110(0) and the second coherence granule 110(1), some embodiments may provide that the first coherence granule 110(0) and the second coherence granule 110(1) may map to different COPs.

In FIG. 2, operations begin with the PE 102(0) sending a request 202 for a CPAA token for the address block 111(0) containing the first coherence granule 110(0) to the SPCOP 120. The SPCOP 120 responds by distributing a CPAA token 204 for the address block 111(0) containing the first coherence granule 110(0). This begins a period during which the CPAA token is considered to be "active." In some embodiments, the SPCOP 120 may distribute the CPAA token 204 by sending a response comprising the CPAA token 204 to the first PE 102(0). Some embodiments may provide that the SPCOP 120 distributes the CPAA token 204 by sending a response to the first PE 102(0) indicating that the first PE 102(0) is to retry its request 202 for the CPAA token 204 for the first coherence granule 110(0). According to some embodiments, the SPCOP 120 may distribute the CPAA token 204 only if one of the following conditions are met: (1) the request 202 does not match an active CPAA token and there are CPAA tokens available; or (2) the request is from a PE 102(0)-102(P) that is next in a CPAA reservation queue of the SPCOP 120 (as discussed in greater detail with respect to FIG. 3), and the request does not correspond to an active CPAA token.

After receiving the CPAA token 204, the PE 102(0) then sends a request 206 to obtain the first coherence granule 110(0) in an exclusive state to a COP (in this example, the COP 114). Upon the first coherence granule 110(0) becoming available, the COP 114 sends a response 208 granting access to the first coherence granule 110(0) in an exclusive state to the PE 102(0), thereby opening a CPAA protection window. The PE 102(0) next sends a request 210 to obtain the second coherence granule 110(0) in an exclusive state to the COP 114. When the second coherence granule 110(0) becomes available, the COP 114 sends a response 212 granting access to the second coherence granule 110(1) in an exclusive state. At this point, the CPAA protection window ends and the normal protection window, during which the PE 102(0) is able to complete the atomic memory access request 122, is opened. After completing the atomic memory access request 122, the PE 102(0) sends a request 214 to return the CPAA token 204 to the SPCOP 120. When the SPCOP 120 receives the request 214, the CPAA token 204 for the address block 111(0) containing the first coherence granule 110(0) is considered inactive. The SPCOP 120 then sends a response 216 indicating that the CPAA token 204 has been returned.

To avoid starvation of CPAA tokens from other PEs 102(0)-102(P), once the PE 102(0) has completed its atomic memory access for the pair of coherence granules 110(0), 110(1), the PE 102(0) must request a new CPAA token when it wants to perform an atomic memory access for a second pair of coherence granules 110(0)-110(C).

In some embodiments, the atomic memory access to be performed by the PE 102(0) may be to a non-cacheable memory location. In such embodiments, as part of the process of acquiring the coherence granules 110(0) and 110(1) in an exclusive state, the PE 102(0) registers the atomic memory access request 122 with the snoop filter 112 to indicate that the snoop filter 112, when handling a subsequent access to the non-cacheable memory location by another PE 102(0)-102(P), causes a snoop request to be sent to the PE 102(0). The PE 102(0) may then follow the flow described above with respect to obtaining a CPAA token and performing the atomic memory access.

Figure 3:
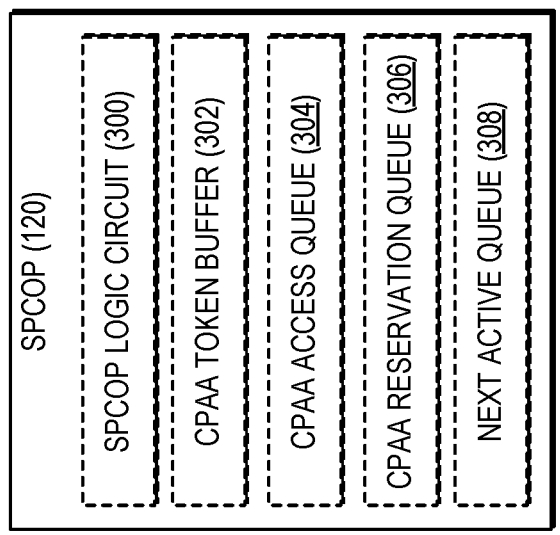
FIG. 3 is a block diagram illustrating in greater detail an exemplary embodiment of the SPCOP of FIG. 1.

FIG. 3 illustrates in greater detail the constituent elements of an exemplary embodiment of the SPCOP 120 of FIG. 1. It is to be understood that some embodiments of the SPCOP 120 may include more or fewer constituent elements than those illustrated in FIG. 3. As seen in FIG. 3, the SPCOP 120 provides an SPCOP logic circuit 300, which is configured to provide the functionality attributed to the SPCOP 120 as described herein. The SPCOP 120 may also provide a CPAA token buffer 302, which may be used to store data (e.g., a memory address of a coherence granule associated with a CPAA token and/or an identifier of the PE that requested the CPAA token, as non-limiting examples) for one or more CPAA tokens.

In some embodiments, the SPCOP 120 may provide a CPAA access queue 304, which is used to track requests to access coherence granules (e.g., in the case of the PE 102(P) that was instructed to resend its request to the SPCOP 120, as discussed above). If such a request is received by the SPCOP 120, the SPCOP 120 may first determine whether the request matches an active CPAA token, and, if not, the SPCOP 120 sends a response indicating that the requesting PE 102(P) is to return to conventional memory coherence handling by, for example, resending its request using the conventional channel. However, if the request does match an active CPAA token such as the CPAA token 204, the SPCOP 120 may record an identifier for the request, along with the corresponding CPAA token slot, in an entry of the CPAA access queue 304. When the CPAA token 204 is eventually returned to the SPCOP 120, the SPCOP 120 sends a response indicating that the requesting PE 102(P) is to return to conventional memory coherence handling. If the CPAA access queue 304 is full when the SPCOP 120 attempts to add a new entry, the SPCOP 120 may send a response to the PE 102(P) indicating that the PE 102(P) should retry its request to the SPCOP 120 again.

Finally, the SPCOP 120 according to some embodiments may include a CPAA reservation queue 306 to allow CPAA tokens to be reserved by requesting PEs 102(0)-102(P). When the SPCOP 120 receives a request for a CPAA token, such as the request 202 of FIG. 2, the SPCOP 120 may add the request 202 to the CPAA reservation queue 306 if any one of the following conditions is met: (1) the request 202 does not match an active CPAA token, but no CPAA tokens are available to distribute; (2) the request 202 matches an active CPAA token; or (3) the request is from a PE 102(0)-102(P) that is next in the CPAA reservation queue 306, but the memory address of the request matches that of an active CPAA token (i.e., the memory address requires access to an address block 111(0)-111(A) for which an active CPAA token is outstanding).

When the SPCOP 120 next has a CPAA token available, it may distribute the CPAA token as described above with respect to the CPAA token 204. In particular, the SPCOP 120 in some embodiments may send a response comprising the CPAA token to the PE 102(0)-102(P) that is next in the CPAA reservation queue 306. Such embodiments require the SPCOP 120 to store the memory address of the coherence granule requested by the PE in the CPAA reservation queue 306, which may not scale well if there are a large number of PEs 102(0)-102(P) that may attempt to request a CPAA token. According to some embodiments, the SPCOP 120 may send a response to the PE 102(0)-102(P) that is next in the CPAA reservation queue 306, indicating that the PE 102(0)-102(P) should retry its request to obtain a CPAA token. In such embodiments, the SPCOP 120 may check to ensure that an identifier of a PE 102(0)-102(P) for an incoming request for a CPAA token matches the PE 102(0)-102(P) that is next in the CPAA reservation queue 306 before distributing an available CPAA token. This allows the SPCOP 120 to obtain the memory address of the coherence granule for the CPAA token and also maintain the reservation for the PE 102(0)-102(P) without needing to record the full memory address of the coherence granule for every entry in the CPAA reservation queue 306.

Some embodiments may provide that the CPAA reservation queue 306 comprises a bit vector having a size that is one less than the number of PEs 102(0)-102(P) that may be expected to perform an atomic memory access. In such embodiments, the SPCOP 120 may limit the number of concurrent CPAA tokens per PE 102(0)-102(P) to be one (1), and may use the bit vector to record each request in the CPAA reservation queue 306 rather than storing a full identifier for each PE 102(0)-102(P) per CPAA token request. In this manner, the scalability of the CPAA reservation queue 306 may be increased.

To prevent a denial of service (DoS) attack by a malicious agent, the SPCOP 120 in some embodiments may be configured to copy the CPAA reservation queue 306 into a next active queue 308. The SPCOP 120 may then select the PEs 102(0)-102(P) in the next active queue 308 as CPAA tokens become available, while recording newly arriving requests for CPAA tokens in the CPAA reservation queue 306. The CPAA reservation queue 306 may subsequently be copied into the next active queue 308 when the next active queue 308 is emptied. Such embodiments ensure that every PE 102(0)-102(P) is afforded an opportunity to obtain a CPAA token before any PE 102(0)-102(P) is allowed to receive a second CPAA token.

Figure 4A:
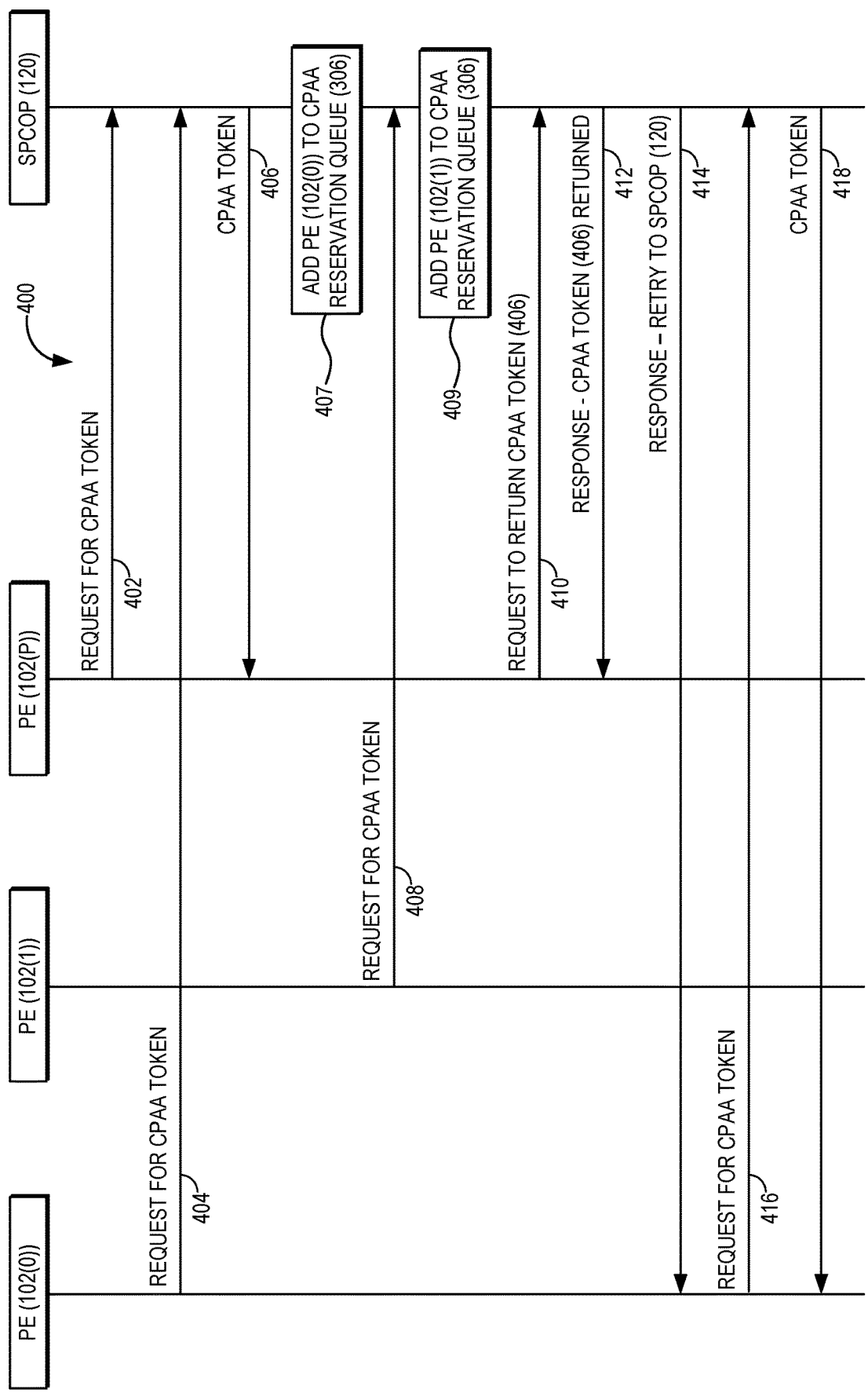
FIGS. 4A-4B are message flow diagrams illustrating exemplary communication flows between the SPCOP of FIG. 1 and multiple PEs that are each requesting a CPAA token.
Figure 4B:
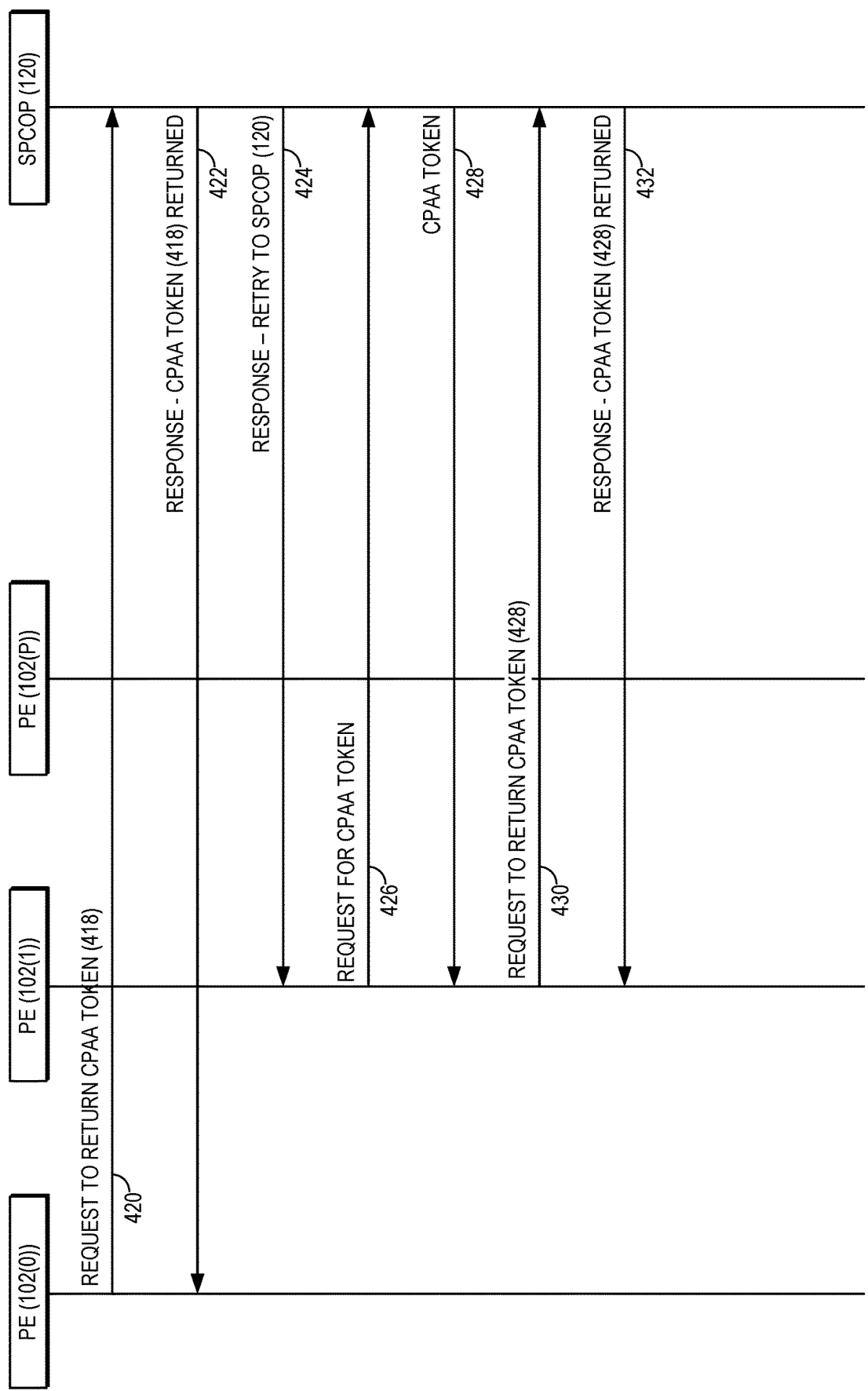

FIGS. 4A and 4B illustrate exemplary communication flows between multiple PEs 102(0), 102(1), and 102(P) and the SPCOP 120 of FIG. 1, where the PEs 102(0), 102(1), and 102(P) are each attempting to obtain a CPAA token (with the assumption that, in this example, only a single CPAA token is available). Elements of FIGS. 1 and 3 are referenced in describing FIGS. 4A and 4B for the sake of clarity. In FIGS. 4A and 4B, a message flow diagram 400 shows the PEs 102(0), 102(1), and 102(P) and the SPCOP 120 represented by vertical lines, with communications between these elements illustrated by captioned arrows and operations performed by each element illustrated by captioned boxes. It is to be assumed that the SPCOP 120 in FIGS. 4A and 4B implements its CPAA reservation queue (e.g., the CPAA reservation queue 306 of FIG. 3) using a bit vector or another implementation in which the CPAA reservation queue 306 does not record an identifier for the PEs 102(0), 102(1) and 102(P) or an identifier for a CPAA token.

Operations begin in FIG. 4A with the PE 102(P) sending a request 402 for a CPAA token to the SPCOP 120, followed by the PE 102(0) sending a request 404 for a CPAA token to the SPCOP 120. The SPCOP 120 distributes a CPAA token 406 to the PE 102(P). Because the SPCOP 120 also received the request 404 from the PE 102(0), the PE 102(0) is added to the CPAA reservation queue 306 of the SPCOP 120, as indicated by box 407. Shortly thereafter, the PE 102(1) also sends its own request 408 for a CPAA token, and is also added to the CPAA reservation queue 306 of the SPCOP 120, as indicated by box 409. After PE 102(P) completes its atomic memory access, the PE 102(P) sends a request 410 to return the CPAA token 406 to the SPCOP 120. The SPCOP 120 acknowledges the return of the CPAA token 406 by sending a response 412 to the PE 102(P).

The SPCOP 120 then reserves a next CPAA token for the next PE (i.e., the PE 102(0)) in the CPAA reservation queue 306, and begins a communications exchange to distribute a CPAA token to PE 102(0). The SPCOP 120 thus sends a response 414 to the PE 102(0) to retry its request 404 for a CPAA token. Consequent to receiving the response 414, the PE 102(0) sends a request 416 for a CPAA token to the SPCOP 120. The SPCOP 120 then distributes a CPAA token 418 to the PE 102(0). Communications then continue in FIG. 4B.

Turning now to FIG. 4B, the PE 102(0), upon completing its atomic memory access, sends a request 420 to return the CPAA token 418 to the SPCOP 120. The SPCOP 120 acknowledges the return of the CPAA token 418 by sending a response 422 to the PE 102(0), and then sends a response 424 to the next PE (i.e., PE 102(1)) in the CPAA reservation queue 306 to notify the PE 102(1) to retry its request 408 for a CPAA token. The PE 102(1) thus sends another request 426 for a CPAA token, and the SPCOP 120 responds by distributing a CPAA token 428. After completing its atomic memory access, the PE 102(1) sends a request 430 to return its CPAA token 428, and the SPCOP 120 sends a response 432 to acknowledge that the CPAA token 428 was returned.

It is to be understood that, depending on the implementation of the CPAA reservation queue 306, the SPCOP 120 may distribute tokens to the PEs 102(0) and 102(1) in a different order than their respective requests 404 and 408 were received by the SPCOP 120. For example, assume that the CPAA reservation queue 306 is implemented as a bit vector, and the request 408 for the PE 102(1) is received before the request 404 for the PE 102(0). This would result in both the bits representing the PEs 102(1) and 102(0) being set in the CPAA reservation queue 306 when their respective requests 408 and 404 are received by the SPCOP 120. However, the SPCOP 120 may still process the bits representing the PEs 102(0) and 102(1) in order, resulting in the PE 102(0) being issued its CPAA token 418 before the PE 102(1) is issued its CPAA token 428.

Figure 5A:
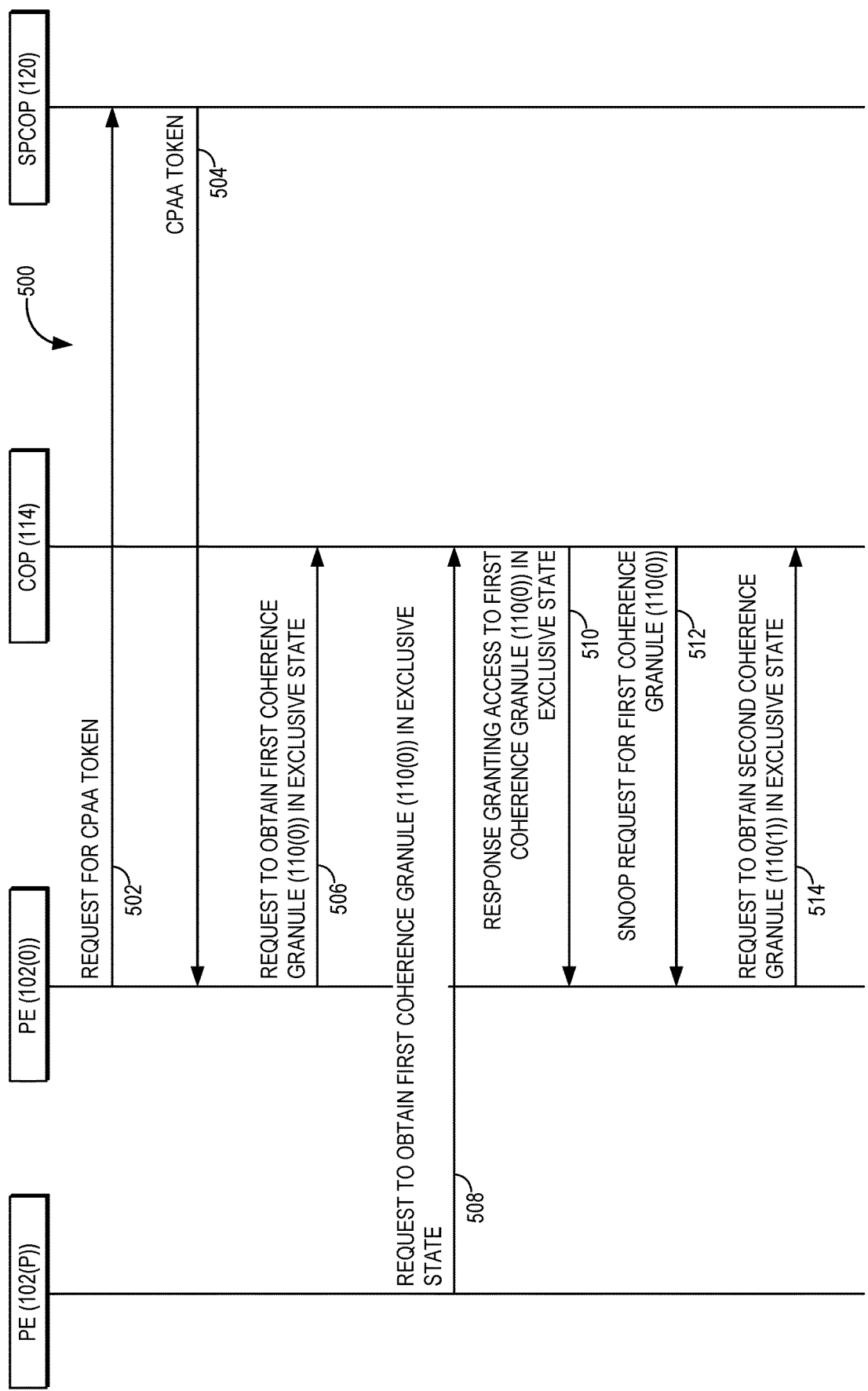
FIGS. 5A-5C are message flow diagrams illustrating exemplary communication flows between the SPCOP of FIG. 1 and multiple PEs for using the CPAA access queue of the SPCOP to record attempts to access a coherence granule that is protected by an active CPAA token.
Figure 5B:
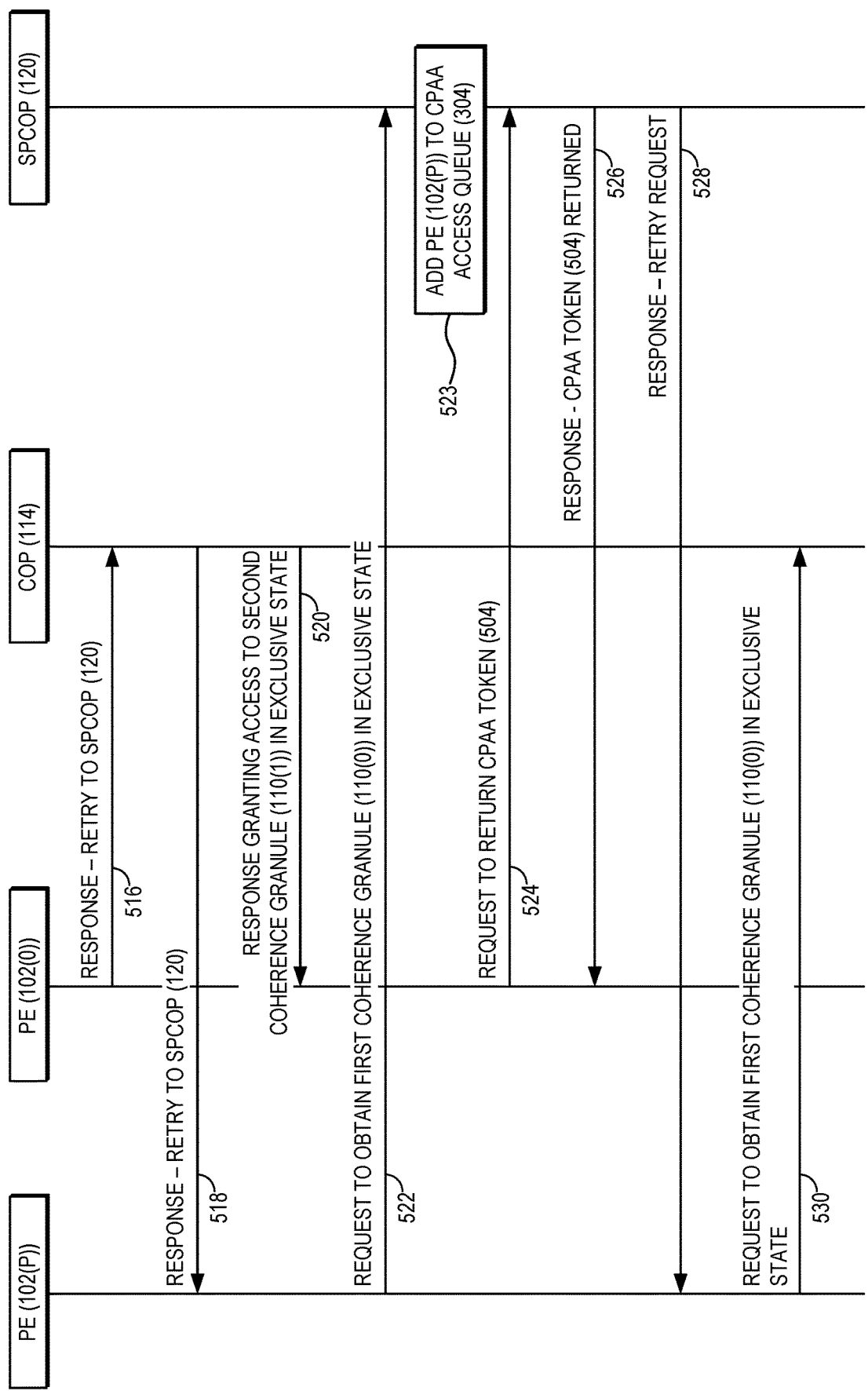
Figure 5C:
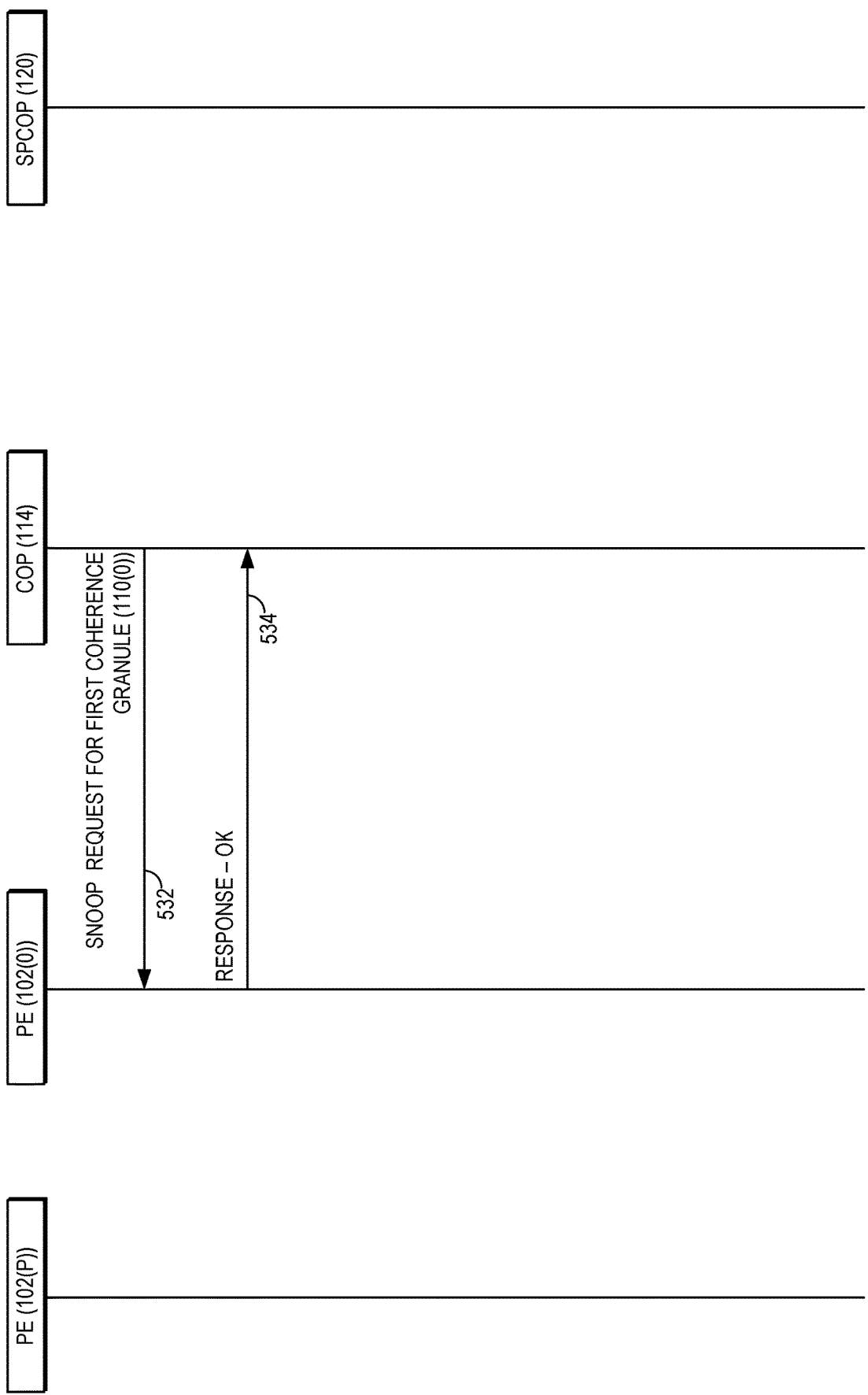

To illustrate exemplary communication flows between the SPCOP 120 of FIG. 1 and multiple PEs 102(0) and 102(P) for using the CPAA access queue 304 of the SPCOP 120 to record attempts to access a coherence granule that is protected by an active CPAA token, FIGS. 5A-5C are provided. For the sake of clarity, elements of FIGS. 1 and 3 are referenced in describing FIGS. 5A-5C. In the example of FIGS. 5A-5C, it is assumed that the size of each address block 111(0)-111(A) is the same as the size of each coherence granule 110(0)-110(C). In FIGS. 5A-5C, a message flow diagram 500 shows the PEs 102(0) and 102(P), the COP 114, and the SPCOP 120 represented by vertical lines, with communications between these elements illustrated by captioned arrows and operations performed by each element illustrated by captioned boxes.

In FIG. 5A, operations begin with the PE 102(0) sending a request 502 for a CPAA token to the SPCOP 120. As a result of receiving the request 502, the SPCOP distributes a CPAA token 504 to the PE 102(0). The PE 102(0) then sends a request 506 to obtain the first coherence granule (e.g., the coherence granule 110(0) of FIG. 1) in an exclusive state. Around the same time, the PE 102(P) also sends a request 508 to obtain the first coherence granule 110(0) in an exclusive state. The COP 114 responds to the PE 102(0) first by sending a response 510 granting access to the first coherence granule 110(0) an exclusive state. Additionally, due to receiving the request 508 from the PE 102(P), the COP 114 sends a snoop request 512 to the PE 102(0) for the first coherence granule 110(0) (which the PE 102(0) now holds in an exclusive state). The PE 102(0) in the meantime sends a request 514 to the COP 114 seeking to obtain a second coherence granule (e.g., the coherence granule 110 (1)) in an exclusive state. Communications then continue in FIG. 5B.

Referring now to FIG. 5B, consequent to receiving the snoop request 512, the PE 102(0) sends a response 516 to the COP 114 indicating that the requesting PE (i.e., the PE 102(P)) should retry its request 508 to the SPCOP 120. The COP 114 then forwards a response 518 to the PE 102(P) to thus inform the PE 102(P). The COP 114 also sends a response 520 to the PE 102(0) granting access to the second coherence granule 110(1) in an exclusive state. At this point, the PE 102(0) can proceed with performing its atomic memory access on the first coherence granule 110(0) and the second coherence granule 110(1).

The PE 102(P), due to receiving the response 518 from the COP 114, sends a request 522 to the SPCOP 120 seeking to obtain the first coherence granule 110(0) in an exclusive state. The SPCOP 120 determines that the request 522 from the PE 102(P) corresponds to the active CPAA token 504, and thus adds the PE 102(P) to the CPAA access queue 304 as indicated by box 523. The PE 102(0), having completed its atomic memory access at this point, sends a request 524 to return the CPAA token 504 to the SPCOP 120, and the SPCOP 120 sends a response 526 acknowledging that the CPAA token 504 was returned. With the CPAA token 504 no longer active, the SPCOP 120 determines that the PE 102(P) no longer has a hazard with an active CPAA token, and thus sends a response 528 to the PE 102(P) indicating that it should retry its request 508 on the conventional memory coherence handling path. The PE 102(P) then sends a request 530 to obtain the first coherence granule 110(0) in an exclusive state to the COP 114. Communications then continue in FIG. 5C.

Turning now to FIG. 5C, as a result of receiving the request 530, the COP 114 sends a snoop request 532 for the first coherence granule 110(0) to the PE 102(0). The PE 102(0) then sends a response 534 indicating that the PE 102(P) may obtain the desired access to the first coherence granule 110(0).

Figure 6A:
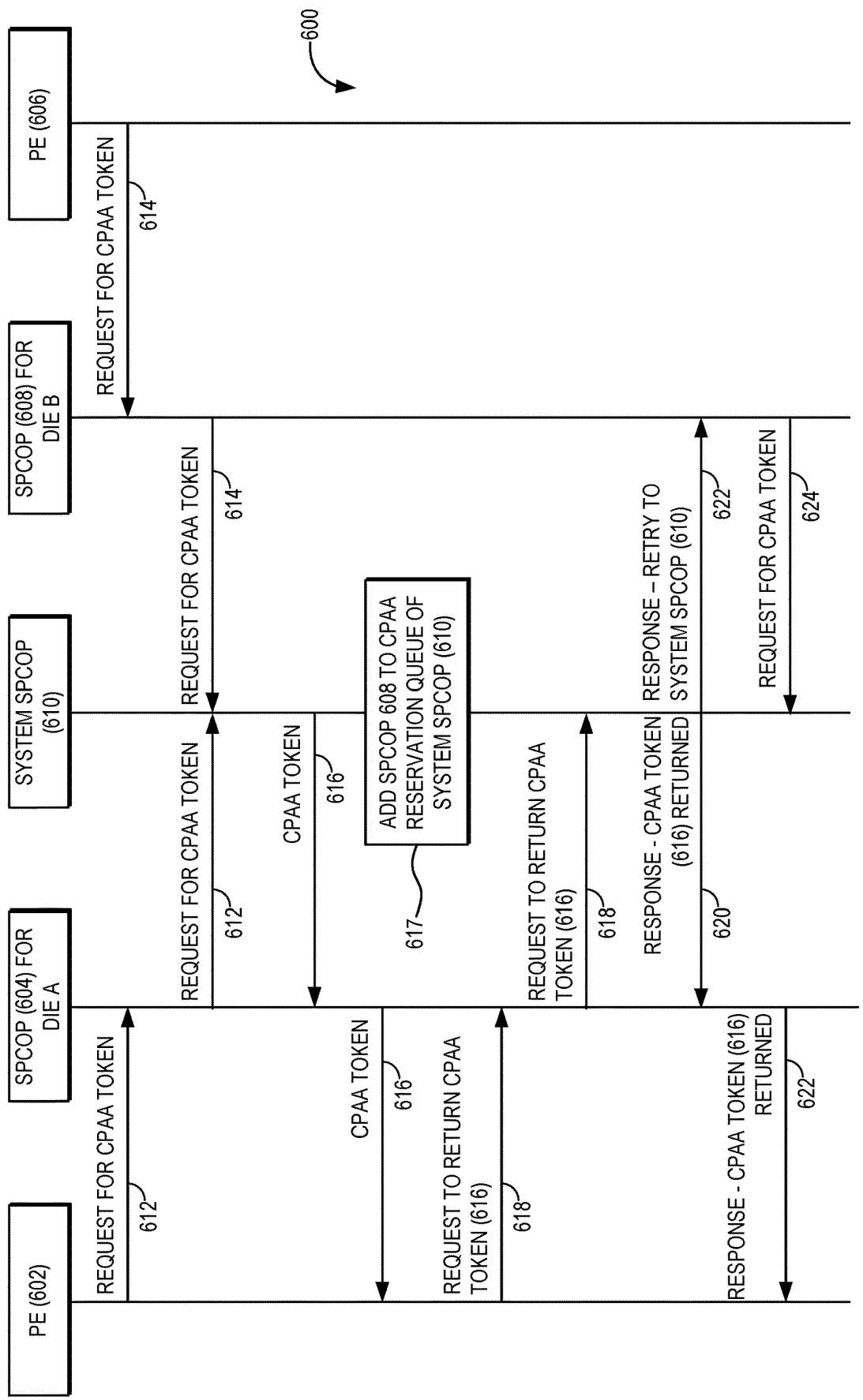
FIGS. 6A and 6B are message flow diagrams illustrating exemplary communication flows between multiple SPCOPs and PEs that are located on multiple dies of the processor-based device of FIG. 1.
Figure 6B:
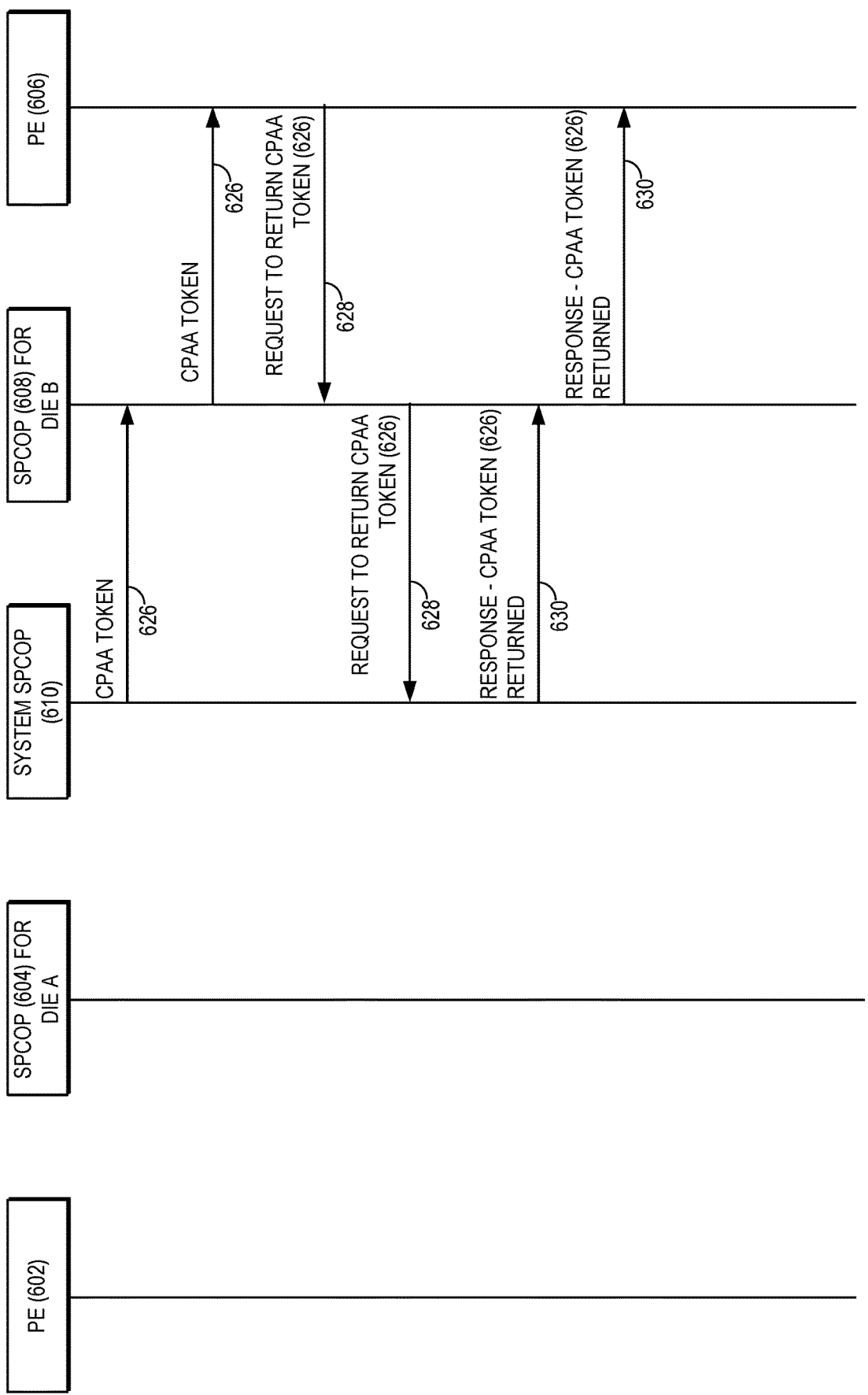

As noted above, some embodiments of the processor-based device 100 of FIG. 1 may include multiple dies 116(0)-116(D), each of which may include PEs and an SPCOP corresponding to the PEs 102(0)-102(P) and the SPCOP 120 of the die 116(0) of FIG. 1. In this regard, FIGS. 6A and 6B provide a message flow diagram 600 illustrating exemplary communication flows between multiple SPCOPs and PEs that are located on multiple dies 116(0)-116(D) of the processor-based device 100 of FIG. 1. Elements of FIG. 1 are referenced in describing FIGS. 6A and 6B for the sake of clarity. In this example, consider two dies, Die A and Die B, each of which may correspond to one of the dies 116(0)-116(D) of FIG. 1. Die A includes a PE 602 and an SPCOP 604 that correspond in functionality to the PEs 102(0)-102(P) and the SPCOP 120 of FIG. 1, respectively. Likewise, Die B includes a PE 606 and an SPCOP 608 that also correspond in functionality to the PEs 102(0)-102(P) and the SPCOP 120 of FIG. 1, respectively. The SPCOPs 604 and 608 each ensure that PEs on their respective dies take turns obtaining a CPAA token from a system SPCOP 610, which in turn ensures that the SPCOPs 604 and 608 take turns obtaining CPAA tokens. The system SPCOP 610 in some embodiments may comprise one of the SPCOPs 604 or 608, or may comprise another SPCOP on another die. As seen in FIGS. 6A and 6B, each of the PEs 602 and 606, the SPCOPs 604 and 608, and the system SPCOP 610 is represented by a vertical line, with communications between these elements illustrated by captioned arrows.

In FIG. 6A, operations begin with the PE 602 sending a request 612 for a CPAA token to the SPCOP 604 for Die A, which forwards the request 612 for a CPAA token to the system SPCOP 610. At about the same time, the PE 606 sends a request 614 for a CPAA token to the SPCOP 608 for Die B, which forwards the request 614 for a CPAA request to the system SPCOP 610. The system SPCOP 610 opts to distribute a CPAA token 616 to the SPCOP 604, which then forwards the CPAA token 616 to the PE 602. The system SPCOP 610 also adds the SPCOP 608 to its own CPAA reservation queue, as indicated by block 617. After the PE 602 completes its atomic memory access, the PE 602 sends a request 618 to return the CPAA token 616, which the SPCOP 604 forwards to the system SPCOP 610. The system SPCOP 610 sends a response 620 acknowledging the return of the CPAA token 616 to the SPCOP 604, which is forwarded to the PE 602 by the SPCOP 604.

The system SPCOP 610 then identifies the SPCOP 608 as the next SPCOP to receive a CPAA token, and thus sends a response 622 to the SPCOP 608 indicating that the SPCOP 608 should retry its request for a CPAA token. The SPCOP 608 then sends a request 624 for a CPAA token to the system SPCOP 610. Communications then continue in FIG. 6B.

Referring now to FIG. 6B, the system SPCOP 610 distributes a CPAA token 626 to the SPCOP 608, which forwards the CPAA token 626 to the PE 606. After the PE 606 has completed its atomic memory access, the PE 606 sends a request 628 to return the CPAA token 626 to the SPCOP 608, which forwards the request 628 to the system SPCOP 610. The SPCOP 610 sends a response 630 acknowledging the return of the CPAA token 626 to the SPCOP 608, and the SPCOP forwards the response 630 to the PE 606.

Figure 7A:
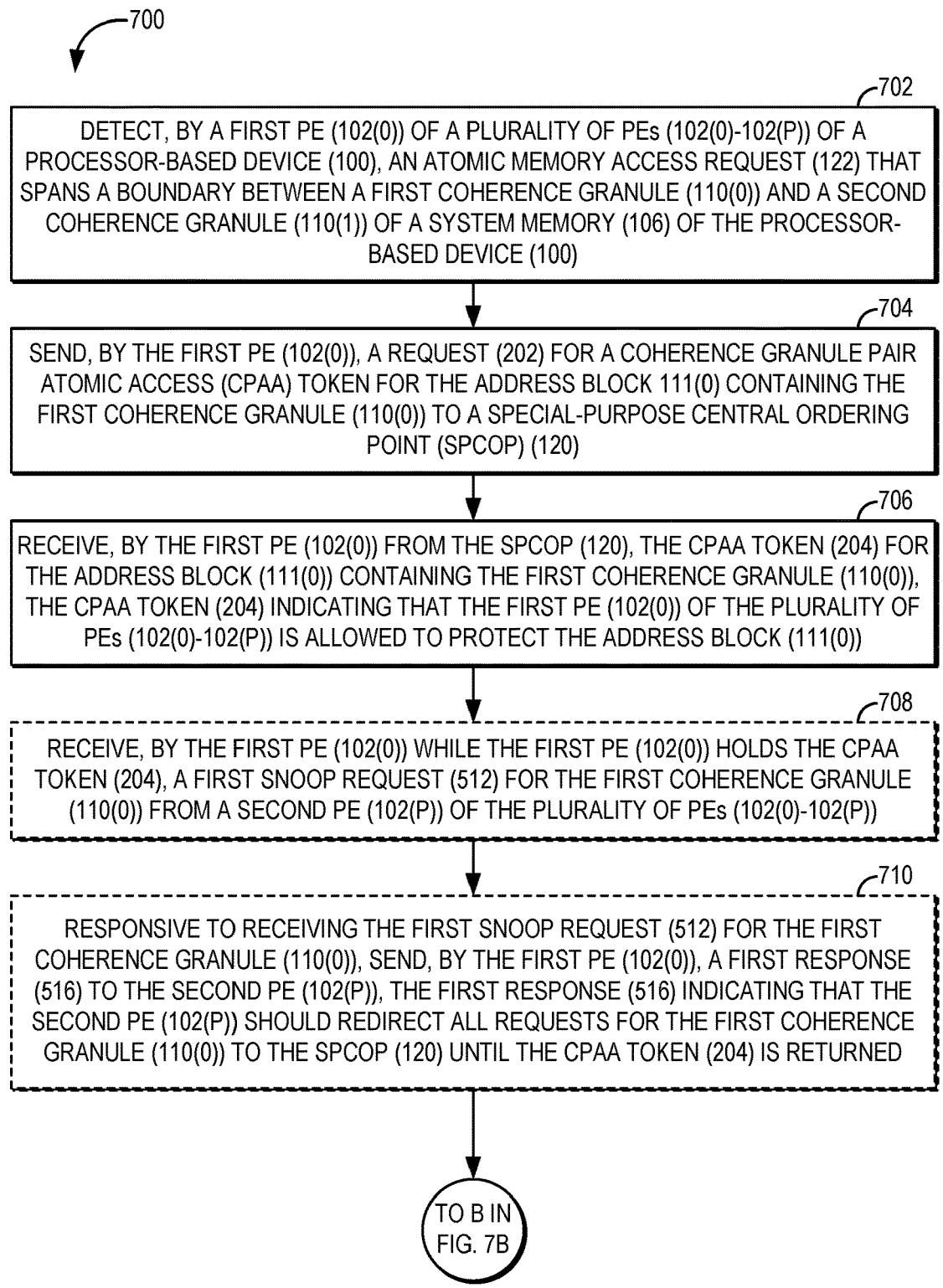
FIGS. 7A and 7B are flowcharts illustrating exemplary operations of the PEs of FIG. 1 for requesting CPAA tokens, obtaining exclusive access to a corresponding pair of coherence granules, and performing an atomic memory access operation, according to some embodiments.
Figure 7B:
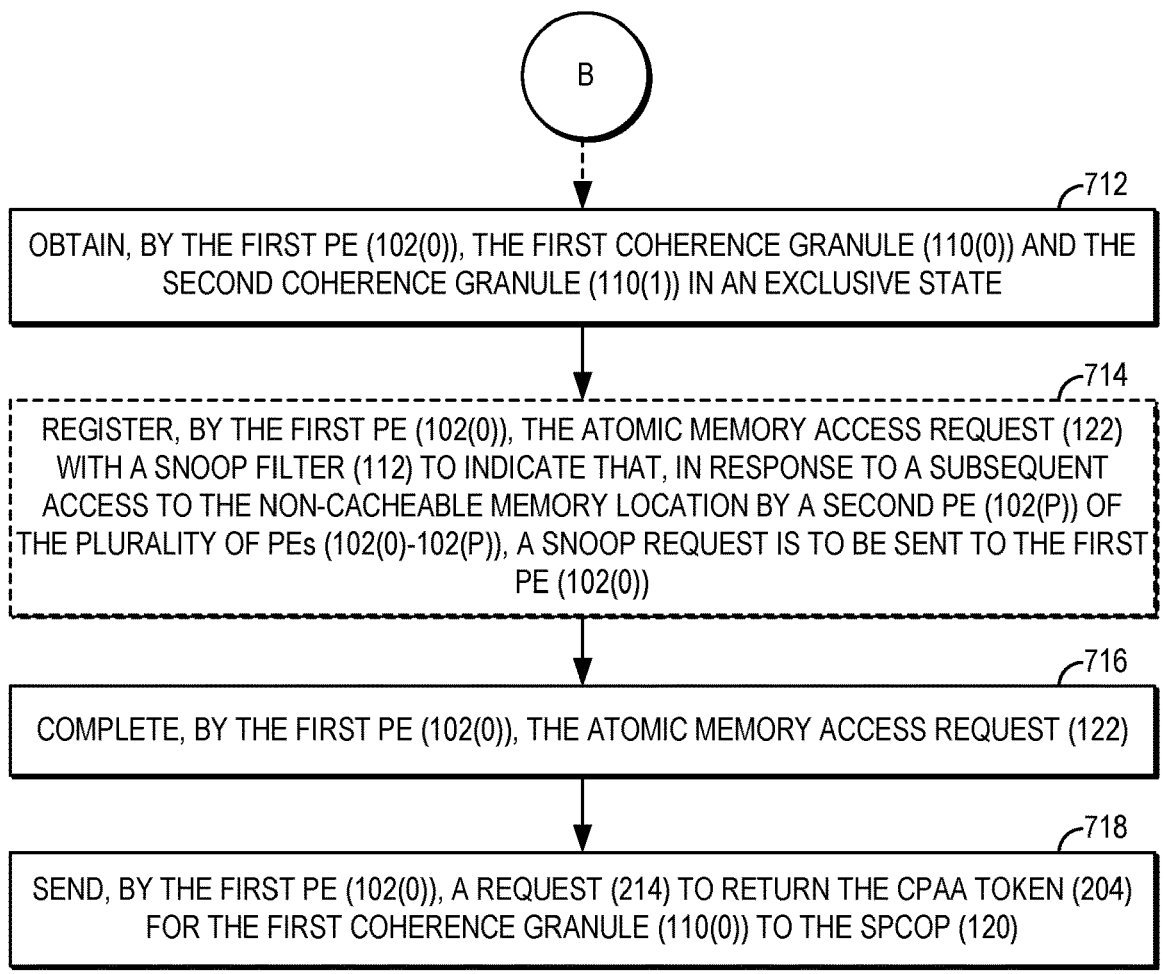

To illustrate exemplary operations of the PEs 102(0)-102(P) of FIG. 1 for requesting CPAA tokens, obtaining exclusive access to a corresponding pair of coherence granules 110(0)-110(C), and performing an atomic memory access operation according to some embodiments, FIGS. 7A and 7B provide a flowchart 700. For the sake of clarity, elements of FIGS. 1, 2, and 5A-5C are referenced in describing FIGS. 7A and 7B. Operations in FIG. 7A begin with the first PE 102(0) of the plurality of PEs 102(0)-102(P) of the processor-based device 100 detecting the atomic memory access request 122 that spans a boundary between the first coherence granule 110(0) and the second coherence granule 110(1) of the system memory 106 of the processor-based device 100, wherein the lowest-order bit of the memory address used to select the first coherence granule 110(0) is the inverse of the lowest-order bit of the memory address used to select the second coherence granule 110(1) (block 702). The first PE 102(0) then sends a request, such as the request 202 of FIG. 2, for a CPAA token for the address block 111(0) containing the first coherence granule 110(0) to the SPCOP 120 (block 704).

Subsequently, the first PE 102(0) receives from the SPCOP 120 a CPAA token (e.g., the CPAA token 204 of FIG. 2) for the address block 111(0) containing the first coherence granule 110(0), the CPAA token 204 indicating that the first PE 102(0) of the plurality of PEs 102(0)-102(P) is allowed to protect the address block 111(0) containing the first coherence granule 110(0) (block 706). In some embodiments, the first PE 102(0) may receive, while the first PE 102(0) holds the CPAA token 204, a first snoop request (such as the snoop request 512 of FIG. 5A) for the first coherence granule 110(0) from the second PE 102(P) of the plurality of PEs 102(0)-102(P) (block 708). Responsive to receiving the first snoop request 512 for the first coherence granule 110(0), the first PE 102(0) may send a first response (i.e., the response 516 of FIG. 5C) to the second PE 102(P), the first response 516 indicating that the second PE 102(P) should redirect all requests for the first coherence granule 110(0) to the SPCOP 120 until the CPAA token 204 is returned (block 710). Processing then resumes at block 712 of FIG. 7B.

Turning now to FIG. 7B, the first PE 102(0) next obtains the first coherence granule 110(0) and the second coherence granule 110(1) in an exclusive state (block 712). According to some embodiments, if the atomic memory access request 122 indicates a non-cacheable memory location, the first PE 102(0) may register the atomic memory access request 122 with a snoop filter 112 to indicate that, due to a subsequent access to the non-cacheable memory location by the second PE 102(P) of the plurality of PEs 102(0)-102(P), a snoop request is to be sent to the first PE 102(0) (block 714). The first PE 102(0) then completes the atomic memory access request 122 (block 716). The first PE 102(0) finally sends a request 214 to return the CPAA token 204 for the first coherence granule 110(0) to the SPCOP 120 (block 718).

Figure 8:
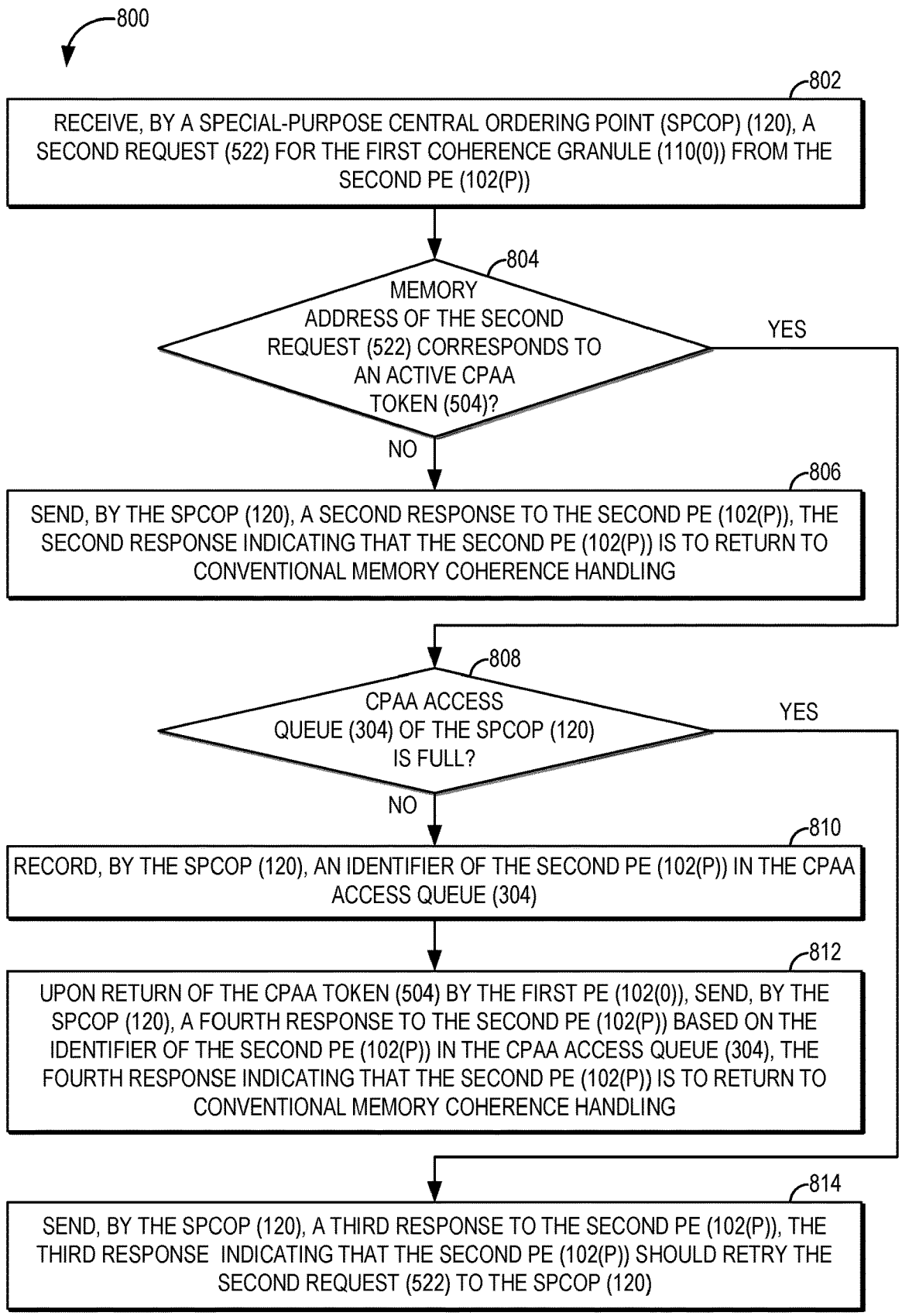
FIG. 8 is a flowchart illustrating exemplary operations of the SPCOP of FIG. 1 for using the CPAA access queue to handle memory accesses to coherence granules protected by an active CPAA token.

FIG. 8 provides a flowchart 800 to illustrate exemplary operations of the SPCOP 120 of FIG. 1 for using a CPAA access queue, such as the CPAA access queue 304 of FIG. 3, to handle memory accesses to coherence granules (e.g., the coherence granules 110(0)-110(C) of FIG. 1) that are protected by an active CPAA token. Elements of FIG. 1 and FIGS. 5A-5C are referenced in describing FIG. 8 for the sake of clarity. In the example of FIG. 8, it is assumed that only one CPAA token may be active at a given time. In FIG. 8, operations begin with an SPCOP, such as the SPCOP 120 of FIG. 1, receiving a second request, such as the request 522 of FIG. 5B, for the first coherence granule 110(0) from a second PE, such the PE 102(P) (block 802). The SPCOP 120 then determines whether the memory address of the second request 522 corresponds to an active CPAA token, such as the CPAA token 504 of FIG. 5A (block 804). If not, the SPCOP 120 sends a second response to the second PE 102(P), the second response indicating that the second PE 102(P) is to return to conventional memory coherence handling (block 806).

If the SPCOP 120 determines at decision block 804 that the memory address of the second request 522 does correspond to the active CPAA token 504, the SPCOP 120 next determines whether the CPAA access queue 304 of the SPCOP 120 is full (block 808). If not, the SPCOP records an identifier of the second PE 102(P) in the CPAA access queue 304 (block 810). Subsequently, upon return of the CPAA token 504 by a first PE (e.g., the PE 102(0) of FIG. 1), the SPCOP 120 sends a fourth response to the second PE 102(P) based on the identifier of the second PE 102(P) in the CPAA access queue 304, the fourth response indicating that the second PE 102(P) is to return to conventional memory coherence handling (block 812). However, if the SPCOP 120 determines at decision block 808 that the CPAA access queue 304 is full, the SPCOP 120 sends a third response to the second PE 102(P), the third response indicating that the second PE 102(P) should retry the second request 522 to the SPCOP 120 (block 814).

Figure 9:
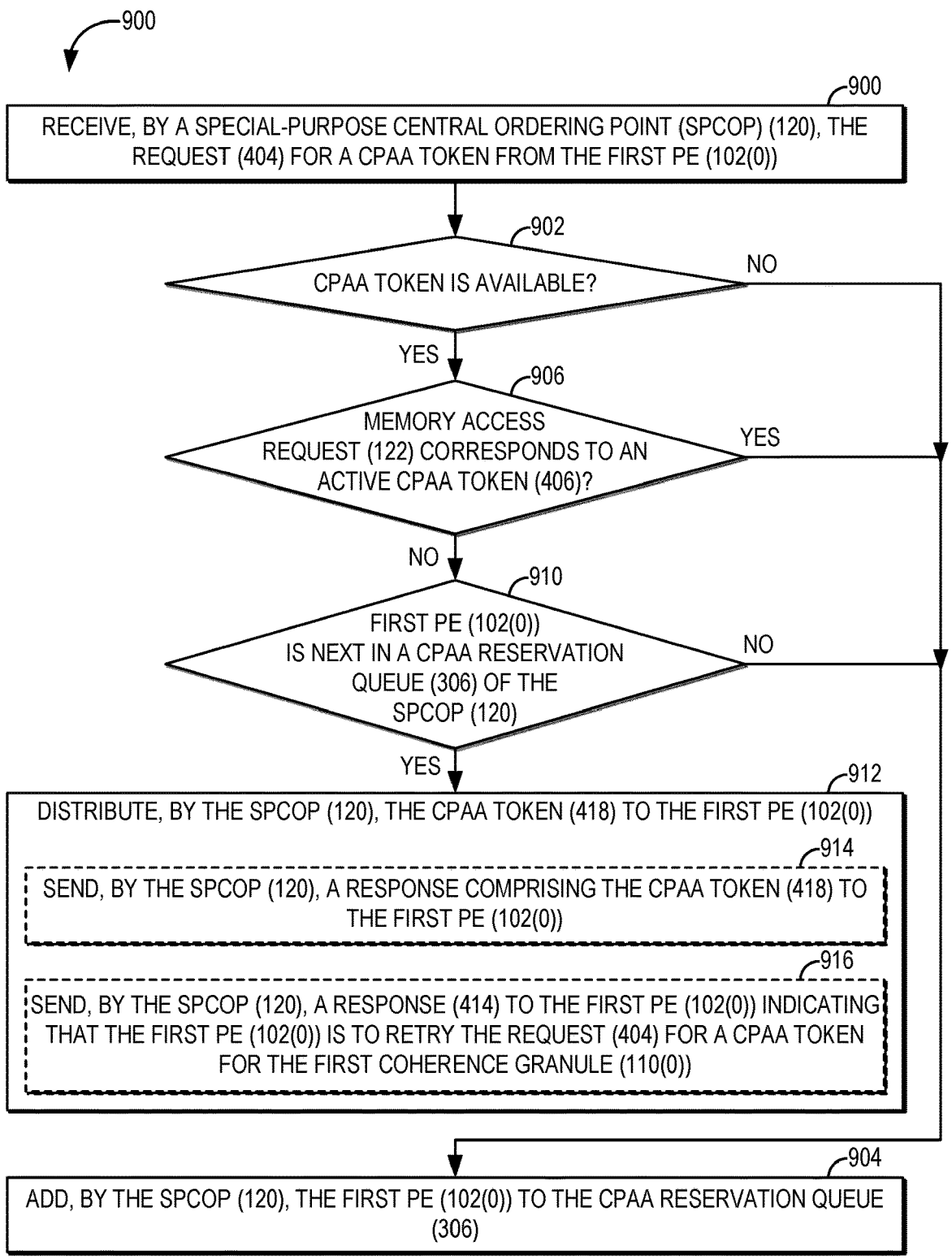
FIG. 9 is a flowchart illustrating exemplary operations of the SPCOP of FIG. 1 for using the CPAA reservation queue to reserve a CPAA token and subsequently distribute a reserved CPAA token.

To illustrate exemplary operations of the SPCOP 120 of FIG. 1 for using the CPAA reservation queue 306 of FIG. 3 to reserve a CPAA token and subsequently distribute a reserved CPAA token, FIG. 9 provides a flowchart 900. For the sake of clarity, elements of FIGS. 1 and 4A-4B are referenced in describing FIG. 9. In FIG. 9, operations begin with an SPCOP, such as the SPCOP 120 of FIG. 1, receiving the request for a CPAA token (such as the request 404 of FIG. 4A) from the first PE 102(0) (block 900). The SPCOP 120 determines whether a CPAA token is available (block 902). If not, the SPCOP adds the first PE 102(0) to the CPAA reservation queue 306 (block 904).

If the SPCOP 120 determines at decision block 902 that a CPAA token is available, the SPCOP 120 next determines whether the atomic memory access request 122 corresponds to an active CPAA token, such as the CPAA token 406 of FIG. 4A (block 906). If so, processing resumes at block 904. If the SPCOP 120 determines at decision block 906 that the atomic memory access request 122 does not correspond to an active CPAA token 406, the SPCOP 120 then determines whether the first PE 102(0) is next in the CPAA reservation queue 306 of the SPCOP 120 (block 910). If not, processing resumes at block 904. However, if the SPCOP 120 determines at decision block 910 that the first PE 102(0) is next in the CPAA reservation queue 306, the SPCOP 120 distributes a CPAA token (i.e., the CPAA token 418) to the first PE 102(0) (block 912). In some embodiments, the operation of block 912 for distributing the CPAA token 418 may comprise the SPCOP 120 sending a response comprising the CPAA token 418 to the first PE 102(0) (block 914). Some embodiments may provide that the operation of block 912 for distributing the CPAA token 418 may comprise the SPCOP 120 sending a response, such as the response 414, to the first PE 102(0) indicating that the first PE 102(0) is to retry the request 404 for a CPAA token for the address block containing the first coherence granule 110(0) (block 916). For example, operations of block 916 may be performed in embodiments in which the first PE 102(0) is next in the CPAA reservation queue 306, and the CPAA reservation queue 306 is implemented such that an identifier of the first PE 102(0) is not stored and thus not known to the SPCOP 120 at the time the CPAA token 418 is to be distributed.

Figure 10:
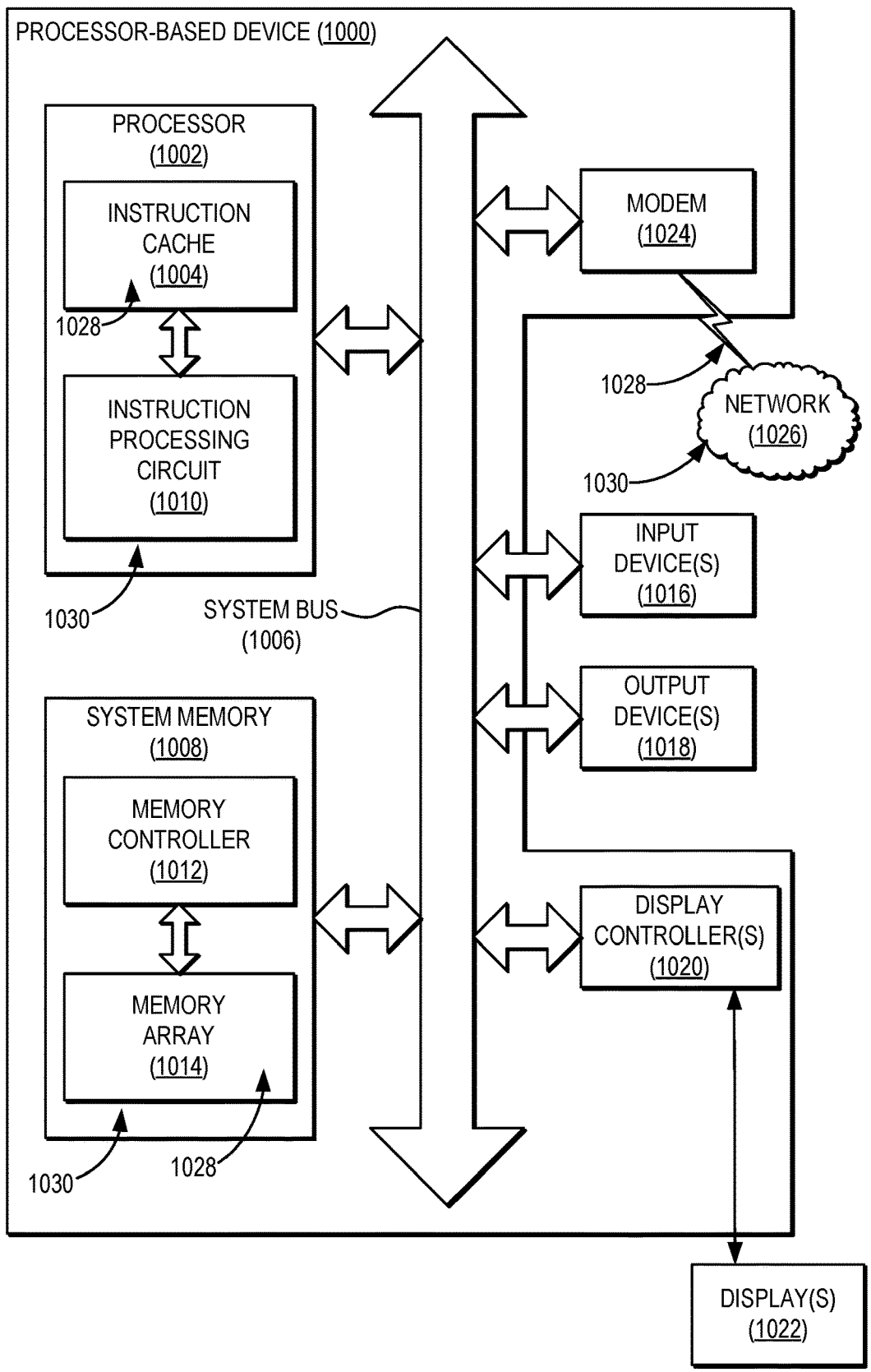
FIG. 10 is a block diagram of an exemplary processor-based device, such as the processor-based device of FIG. 1, that is configured to enable atomic memory accesses across coherence granule boundaries.

FIG. 10 is a block diagram of an exemplary processor-based device 1000, such as the processor-based device 100 of FIG. 1, that enables atomic memory accesses across coherence granule boundaries. The processor-based device 1000 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer. In this example, the processor-based device 1000 includes a processor 1002. The processor 1002 represents one or more general-purpose processing circuits, such as a microprocessor, central processing unit, or the like, and may correspond to the PEs 102(0)-102(P) of FIG. 1. The processor 1002 is configured to execute processing logic in instructions for performing the operations and steps discussed herein. In this example, the processor 1002 includes an instruction cache 1004 for temporary, fast access memory storage of instructions and an instruction processing circuit 1010. Fetched or prefetched instructions from a memory, such as from a system memory 1008 over a system bus 1006, are stored in the instruction cache 1004. The instruction processing circuit 1010 is configured to process instructions fetched into the instruction cache 1004 and process the instructions for execution.

The processor 1002 and the system memory 1008 are coupled to the system bus 1006 and can intercouple peripheral devices included in the processor-based device 1000. As is well known, the processor 1002 communicates with these other devices by exchanging address, control, and data information over the system bus 1006. For example, the processor 1002 can communicate bus transaction requests to a memory controller 1012 in the system memory 1008 as an example of a peripheral device. Although not illustrated in FIG. 10, multiple system buses 1006 could be provided, wherein each system bus constitutes a different fabric. In this example, the memory controller 1012 is configured to provide memory access requests to a memory array 1014 in the system memory 1008. The memory array 1014 is comprised of an array of storage bit cells for storing data. The system memory 1008 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 1006. As illustrated in FIG. 10, these devices can include the system memory 1008, one or more input devices 1016, one or more output devices 1018, a modem 1024, and one or more display controllers 1020, as examples. The input device(s) 1016 can include any type of input device, including, but not limited to, input keys, switches, voice processors, etc. The output device(s) 1018 can include any type of output device, including, but not limited to, audio, video, other visual indicators, etc. The modem 1024 can be any device configured to allow exchange of data to and from a network 1026. The network 1026 can be any type of network, including, but not limited to, a wired or wireless network, a private or public network, a local area network (LAN), a wireless local area network (WLAN), a wide area network (WAN), a BLUETOOTH™ network, and the Internet. The modem 1024 can be configured to support any type of communications protocol desired. The processor 1002 may also be configured to access the display controller(s) 1020 over the system bus 1006 to control information sent to one or more displays 1022. The display(s) 1022 can include any type of display, including, but not limited to, a cathode ray tube (CRT), a liquid crystal display (LCD), a plasma display, etc.

The processor-based device 1000 in FIG. 10 may include a set of instructions 1028 that may be encoded with the reach-based explicit consumer naming model to be executed by the processor 1002 for any application desired according to the instructions. The instructions 1028 may be stored in the system memory 1008, processor 1002, and/or instruction cache 1004 as examples of non-transitory computer-readable medium 1030. The instructions 1028 may also reside, completely or at least partially, within the system memory 1008 and/or within the processor 1002 during their execution. The instructions 1028 may further be transmitted or received over the network 1026 via the modem 1024, such that the network 1026 includes the computer-readable medium 1030.

While the computer-readable medium 1030 is shown in an exemplary embodiment to be a single medium, the term "computer-readable medium" should be taken to include a single medium or multiple media (e.g., a centralized or distributed database, and/or associated caches and servers) that store the one or more sets of instructions 1028. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software process.

The embodiments disclosed herein may be provided as a computer program product, or software process, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor-based device, comprising:
   a system memory comprising a plurality of address blocks and a plurality of coherence granules; and
   a special-purpose central ordering point (SPCOP) comprising an SPCOP logic circuit; and
   a plurality of processing elements (PEs) each comprising a memory access logic circuit;
   the memory access logic circuit of a first PE of the plurality of PEs configured to:
      detect an atomic memory access request that spans a boundary between a first coherence granule and a second coherence granule of the system memory;
      send a request for a coherence granule pair atomic access (CPAA) token for an address block containing the first coherence granule to the SPCOP;
      receive, from the SPCOP, the CPAA token for the address block containing the first coherence granule, the CPAA token indicating that the first PE of the plurality of PEs is allowed to protect the address block containing the first coherence granule;
      obtain the first coherence granule and the second coherence granule in an exclusive state;
      complete the atomic memory access request; and
      send a request to return the CPAA token for the address block containing the first coherence granule to the SPCOP.

2. The processor-based device of claim 1, wherein the memory access logic circuit of the first PE is further configured to:
   receive, while the first PE holds the CPAA token, a first snoop request for the first coherence granule from a second PE of the plurality of PEs; and
   responsive to receiving the first snoop request for the first coherence granule, send a first response to the second PE, the first response indicating that the second PE should redirect all requests for the first coherence granule to the SPCOP until the CPAA token is returned.

3. The processor-based device of claim 2, wherein the SPCOP logic circuit of the SPCOP is configured to:
   receive a second request for the first coherence granule from the second PE;
   determine whether a memory address of the second request corresponds to an active CPAA token;
   responsive to determining that the memory address of the second request does not correspond to an active CPAA token, send a second response to the second PE, the second response indicating that the second PE is to return to conventional memory coherence handling;
   responsive to determining that the memory address of the second request corresponds to an active CPAA token, determine whether a CPAA access queue of the SPCOP is full;
   responsive to determining that the CPAA access queue of the SPCOP is full, send a third response to the second PE, the third response indicating that the second PE should retry the second request to the SPCOP; and
   responsive to determining that the CPAA access queue of the SPCOP is not full:
      record an identifier of the second PE in the CPAA access queue; and
      upon return of the CPAA token by the first PE, send a fourth response to the second PE based on the identifier of the second PE in the CPAA access queue, the fourth response indicating that the second PE is to return to conventional memory coherence handling.

4. The processor-based device of claim 1, wherein the SPCOP logic circuit of the SPCOP is configured to:
   receive the request for a CPAA token from the first PE;
   determine whether a CPAA token is available;
   responsive to determining that a CPAA token is available, determine whether the atomic memory access request corresponds to an active CPAA token; and
   responsive to determining that the atomic memory access request does not correspond to an active CPAA token, distribute the CPAA token to the first PE.

5. The processor-based device of claim 4, wherein the SPCOP logic circuit of the SPCOP is configured to distribute the CPAA token to the first PE by being configured to send a response comprising the CPAA token to the first PE.

6. The processor-based device of claim 4, wherein the SPCOP logic circuit of the SPCOP is configured to distribute the CPAA token to the first PE by being configured to send a response to the first PE indicating that the first PE is to retry the request for the CPAA token for the address block containing the first coherence granule.

7. The processor-based device of claim 4, wherein the SPCOP logic circuit of the SPCOP is further configured to distribute the CPAA token to the first PE by being configured to:
determine whether the first PE is next in a CPAA reservation queue of the SPCOP; and
distribute the CPAA token to the first PE responsive to determining that the first PE is next in the CPAA reservation queue of the SPCOP.

8. The processor-based device of claim 7, wherein the SPCOP logic circuit of the SPCOP is further configured to:
responsive to determining that a CPAA token is not available, add the first PE to the CPAA reservation queue;
responsive to determining that the atomic memory access request corresponds to an active CPAA token, add the first PE to the CPAA reservation queue; and
responsive to determining that the first PE is not next in the CPAA reservation queue, add the first PE to the CPAA reservation queue.

9. The processor-based device of claim 1, wherein:
the processor-based device further comprises a snoop filter;
the atomic memory access request comprises an atomic memory access request to a non-cacheable memory location; and
the memory access logic circuit of the first PE is configured to obtain the first coherence granule and the second coherence granule in the exclusive state by being configured to register the atomic memory access request with the snoop filter to indicate that, upon a subsequent access to the non-cacheable memory location by a second PE of the plurality of PEs, a snoop request is to be sent to the first PE.

10. A method for enabling atomic memory accesses that cross coherence granule boundaries, comprising:
detecting, by a first processing element (PE) of a plurality of PEs of a processor-based device, an atomic memory access request that spans a boundary between a first coherence granule and a second coherence granule of a system memory of the processor-based device;
sending, by the first PE, a first request for a coherence granule pair atomic access (CPAA) token for an address block containing the first coherence granule to a special-purpose central ordering point (SPCOP);
receiving, by the first PE from the SPCOP, the CPAA token for the address block containing the first coherence granule, the CPAA token indicating that the first PE of the plurality of PEs is allowed to protect the address block containing the first coherence granule;
obtaining, by the first PE, the first coherence granule and the second coherence granule in an exclusive state;
completing, by the first PE, the atomic memory access request; and
sending, by the first PE, a request to return the CPAA token for the address block containing the first coherence granule to the SPCOP.

11. The method of claim 10, further comprising:
receiving, by the first PE while the first PE holds the CPAA token, a first snoop request for the first coherence granule from a second PE of the plurality of PEs; and
responsive to receiving the first snoop request for the first coherence granule, sending, by the first PE, a first response to the second PE, the first response indicating that the second PE should redirect all requests for the first coherence granule to the SPCOP until the CPAA token is returned.

12. The method of claim 11, further comprising:
receiving, by the SPCOP, a second request for the first coherence granule from the second PE;
determining, by the SPCOP, that a memory address of the second request does not correspond to an active CPAA token; and
responsive to determining that the memory address of the second request does not correspond to an active CPAA token, sending, by the SPCOP, a second response to the second PE, the second response indicating that the second PE is to return to conventional memory coherence handling.

13. The method of claim 11, further comprising:
receiving, by the SPCOP, a third request for the first coherence granule from the second PE;
determining, by the SPCOP, that a memory address of the third request corresponds to an active CPAA token;
responsive to determining that the memory address of the third request corresponds to an active CPAA token, determining, by the SPCOP, that a CPAA access queue of the SPCOP is full; and
responsive to determining that the CPAA access queue of the SPCOP is full, sending, by the SPCOP, a third response to the second PE, the third response indicating that the second PE should retry the third request to the SPCOP.

14. The method of claim 11, further comprising:
receiving, by the SPCOP, a fourth request for the first coherence granule from the second PE;
determining, by the SPCOP, that a memory address of the fourth request corresponds to an active CPAA token;
responsive to determining that the memory address of the fourth request corresponds to an active CPAA token, determining, by the SPCOP, that a CPAA access queue of the SPCOP is not full; and
responsive to determining that the CPAA access queue of the SPCOP is not full:
recording, by the SPCOP, an identifier of the second PE in the CPAA access queue; and
upon return of the CPAA token by the first PE, sending, by the SPCOP, a fourth response to the second PE based on the identifier of the second PE in the CPAA access queue, the fourth response indicating that the second PE is to return to conventional memory coherence handling.

15. The method of claim 10, further comprising:
receiving, by the SPCOP, the first request for the CPAA token from the first PE;
determining, by the SPCOP, that a CPAA token is available;
responsive to determining that a CPAA token is available, determining, by the SPCOP, that the atomic memory access request does not correspond to an active CPAA token; and
responsive to determining that the atomic memory access request does not correspond to an active CPAA token, distributing, by the SPCOP, the CPAA token to the first PE.

16. The method of claim 15, wherein distributing the CPAA token to the first PE comprises sending a response comprising the CPAA token to the first PE.

17. The method of claim 15, wherein distributing the CPAA token to the first PE comprises sending a response to the first PE indicating that the first PE is to retry the first request for the CPAA token for the address block containing the first coherence granule.

18. The method of claim 15, further comprising determining that the first PE is next in a CPAA reservation queue of the SPCOP;
 wherein distributing the CPAA token to the first PE is responsive to determining that the first PE is next in the CPAA reservation queue of the SPCOP.

19. The method of claim 18, further comprising:
 receiving, by the SPCOP, a second request for a CPAA token from the first PE;
 determining, by the SPCOP, that a CPAA token is not available; and
 responsive to determining that a CPAA token is not available, adding, by the SPCOP, the first PE to the CPAA reservation queue.

20. The method of claim 18, further comprising:
 receiving, by the SPCOP, a third request for a CPAA token from the first PE;
 determining, by the SPCOP, that a CPAA token is available;
 responsive to determining that the CPAA token is available, determining that the atomic memory access request corresponds to an active CPAA token; and
 responsive to determining that the atomic memory access request corresponds to an active CPAA token, adding, by the SPCOP, the first PE to the CPAA reservation queue.

21. The method of claim 18, further comprising:
 receiving, by the SPCOP, a fourth request for the CPAA token from the first PE;
 determining, by the SPCOP, that a CPAA token is available;
 responsive to determining that the CPAA token is available, determining that the atomic memory access request does not correspond to an active CPAA token;
 responsive to determining that the atomic memory access request does not correspond to an active CPAA token, determining that the first PE is not next in the CPAA reservation queue; and
 responsive to determining that the first PE is not next in the CPAA reservation queue, adding, by the SPCOP, the first PE to the CPAA reservation queue.

22. The method of claim 10, wherein:
 the atomic memory access request comprises an atomic memory access request to a non-cacheable memory location; and
 obtaining the first coherence granule and the second coherence granule in the exclusive state comprises registering, by the first PE, the atomic memory access request with a snoop filter to indicate that, in response to a subsequent access to the non-cacheable memory location by a second PE of the plurality of PEs, a snoop request is to be sent to the first PE.

23. A non-transitory computer-readable medium having stored thereon computer-executable instructions which, when executed by a processor, cause the processor to:
 detect an atomic memory access request that spans a boundary between a first coherence granule and a second coherence granule of a system memory, wherein a lowest-order bit of a memory address used to select the first coherence granule is the inverse of a lowest-order bit of a memory address used to select the second coherence granule;
 send a request for a coherence granule pair atomic access (CPAA) token for the address block containing the first coherence granule to a special-purpose central ordering point (SPCOP) of the processor;
 receive, from the SPCOP, the CPAA token for the address block containing the first coherence granule, the CPAA token indicating that the processor is allowed to protect the address block containing the first coherence granule;
 obtain the first coherence granule and the second coherence granule in an exclusive state;
 complete the atomic memory access request; and
 send a request to return the CPAA token for the address block containing the first coherence granule to the SPCOP.

* * * * *